United States Patent
Ochiai et al.

(10) Patent No.: US 10,506,134 B2
(45) Date of Patent: Dec. 10, 2019

(54) APPARATUS, METHOD, AND PROGRAM FOR PROCESSING IMAGE

(71) Applicant: CANON KABUSHIKI KAISHA, Tokyo (JP)

(72) Inventors: Takashi Ochiai, Machida (JP); Shoei Moribe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/748,126

(22) PCT Filed: Jul. 22, 2016

(86) PCT No.: PCT/JP2016/003427
§ 371 (c)(1),
(2) Date: Jan. 26, 2018

(87) PCT Pub. No.: WO2017/017942
PCT Pub. Date: Feb. 2, 2017

(65) Prior Publication Data
US 2018/0234591 A1 Aug. 16, 2018

(30) Foreign Application Priority Data
Jul. 30, 2015 (JP) .................. 2015-150507

(51) Int. Cl.
*H04N 1/60* (2006.01)
*B41J 2/525* (2006.01)
(Continued)

(52) U.S. Cl.
CPC .............. *H04N 1/6019* (2013.01); *B41J 2/21* (2013.01); *B41J 2/525* (2013.01); *H04N 1/46* (2013.01); *H04N 1/60* (2013.01); *H04N 1/6097* (2013.01)

(58) Field of Classification Search
CPC .................................................. H04N 1/6019
See application file for complete search history.

(56) References Cited

U.S. PATENT DOCUMENTS 5,489,996 A * 2/1996 Oku ........................ H04N 1/60
358/518
5,710,644 A * 1/1998 Ohta ..................... H04N 1/6019
358/504
(Continued)

FOREIGN PATENT DOCUMENTS

EP 1830557 A1 9/2007
EP 1830557 A1 * 9/2007 ........... H04N 1/6016
(Continued)

*Primary Examiner* — Ted W Barnes
(74) *Attorney, Agent, or Firm* — Canon U.S.A., Inc. IP Division

(57) ABSTRACT

An image processing apparatus according an aspect of the present disclosure converts image signals indicating an image to output signals including signals corresponding to individual color components that an output device deals with by interpolation processing using a look-up table. The apparatus includes a first conversion unit and at least one second conversion unit. The first conversion unit converts the image signals to image signals corresponding to linearity of the signals corresponding to the individual color components. The at least one second conversion unit converts the image signals converted by the first conversion unit to the output signals by the interpolation processing.

19 Claims, 33 Drawing Sheets

(51) Int. Cl.
*H04N 1/46* (2006.01)
*B41J 2/21* (2006.01)

(56) References Cited

U.S. PATENT DOCUMENTS

| | | | | |
|---|---|---|---|---|
| 6,335,734 B1* | 1/2002 | Nagae | H04N 1/6019 | 345/589 |
| 6,825,958 B1* | 11/2004 | Fukasawa | H04N 1/6019 | 358/518 |
| 9,667,837 B2* | 5/2017 | Matsuzaki | H04N 1/6025 | |
| 2002/0039104 A1* | 4/2002 | Sato | G09G 5/06 | 345/600 |
| 2002/0060797 A1* | 5/2002 | Namikata | H04N 1/6022 | 358/1.9 |
| 2003/0117457 A1* | 6/2003 | Qiao | H04N 1/6058 | 347/43 |
| 2004/0091148 A1* | 5/2004 | Fukao | H04N 1/6019 | 382/167 |
| 2004/0100640 A1* | 5/2004 | Saito | H04N 1/54 | 358/1.1 |
| 2004/0263881 A1* | 12/2004 | Ito | H04N 1/6058 | 358/1.9 |
| 2004/0263882 A1* | 12/2004 | Ito | H04N 1/6058 | 358/1.9 |
| 2005/0174586 A1* | 8/2005 | Yoshida | G06T 11/001 | 358/1.9 |
| 2005/0264836 A1* | 12/2005 | Gotoh | H04N 1/6019 | 358/1.9 |
| 2006/0176529 A1* | 8/2006 | Ito | H04N 1/6033 | 358/518 |
| 2006/0187505 A1* | 8/2006 | Ng | G03G 15/01 | 358/518 |
| 2006/0232799 A1* | 10/2006 | Nakatani | H04N 1/6019 | 358/1.9 |
| 2006/0256407 A1* | 11/2006 | Hoshii | H04N 1/6019 | 358/518 |
| 2007/0291312 A1* | 12/2007 | Kaneko | H04N 1/6033 | 358/2.1 |
| 2008/0018962 A1* | 1/2008 | Kawai | H04N 1/6019 | 358/522 |
| 2008/0089716 A1* | 4/2008 | Hosono | G03G 13/01 | 399/223 |
| 2009/0190180 A1* | 7/2009 | Verbeeck | H04N 1/6016 | 358/3.23 |
| 2011/0116137 A1* | 5/2011 | Uratani | H04N 1/6058 | 358/3.23 |
| 2011/0194760 A1* | 8/2011 | Ochiai | B41J 2/2125 | 382/164 |
| 2011/0222080 A1* | 9/2011 | Monga | H04N 1/6025 | 358/1.9 |
| 2012/0243011 A1* | 9/2012 | Fukuda | H04N 1/6033 | 358/1.9 |
| 2012/0307266 A1* | 12/2012 | Yu | H04N 1/6019 | 358/1.9 |
| 2013/0120801 A1* | 5/2013 | Shibasaki | H04N 1/6022 | 358/3.24 |
| 2017/0048421 A1* | 2/2017 | Morovic | H04N 1/54 | |
| 2017/0126931 A1* | 5/2017 | Morovic | H04N 1/6016 | |
| 2018/0262649 A1* | 9/2018 | Shimada | H04N 1/6058 | |

FOREIGN PATENT DOCUMENTS

| | | | | |
|---|---|---|---|---|
| EP | 2981056 A1 | | 2/2016 | |
| EP | 2981056 A1 | * | 2/2016 | ........... H04N 1/6019 |
| JP | 2003-110865 A | | 4/2003 | |
| JP | 2003110865 A | * | 4/2003 | |
| JP | 2004-120483 A | | 4/2004 | |
| JP | 2004120483 A | * | 4/2004 | |
| JP | 2011161831 A | | 8/2011 | |
| JP | 2012099938 A | * | 5/2012 | |
| JP | 2012-099938 A | | 5/2014 | |
| JP | 2014-187604 A | | 10/2014 | |
| JP | 2014187604 A | * | 10/2014 | ........... H04N 1/6019 |
| JP | 2017034377 A | * | 2/2017 | ............. B41J 2/525 |
| JP | 2017201758 A | * | 11/2017 | ........... H04N 1/6008 |
| JP | 2017201759 A | * | 11/2017 | |
| WO | 2014/155768 A1 | | 10/2014 | |

\* cited by examiner

FIG. 2A
1051
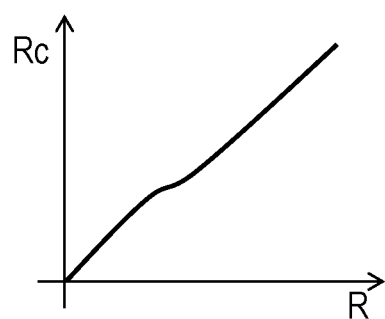
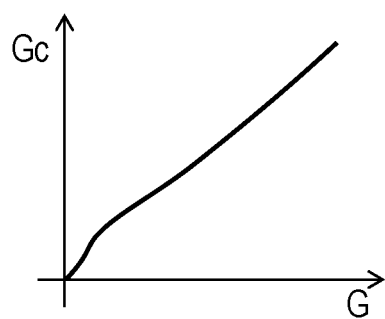
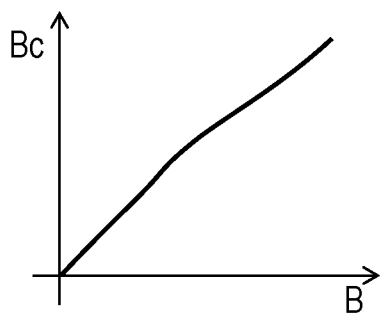

FIG. 2B
1052
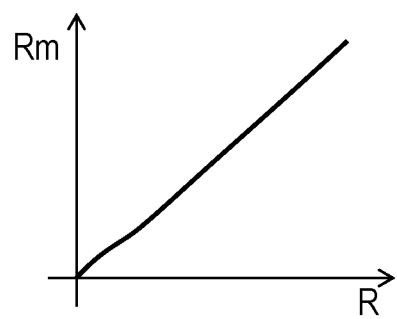
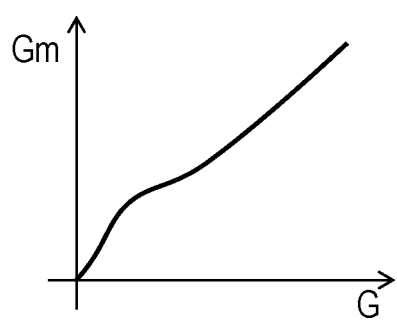
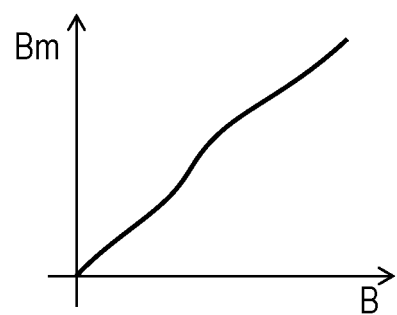

FIG. 2C
1053
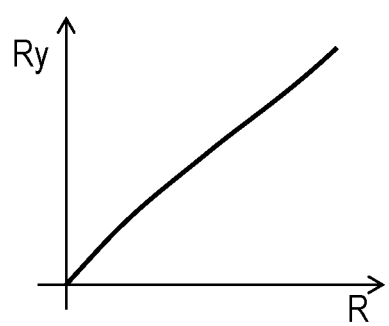
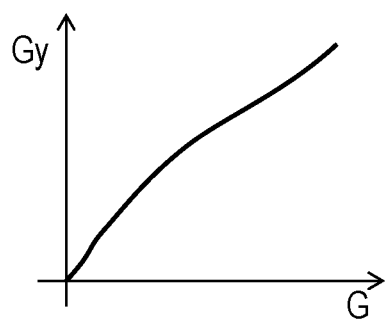
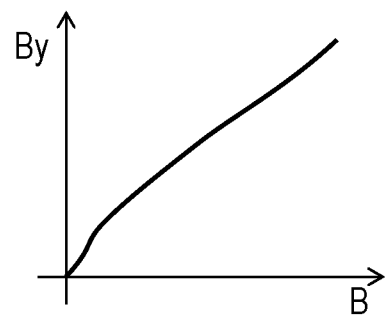

FIG. 2D
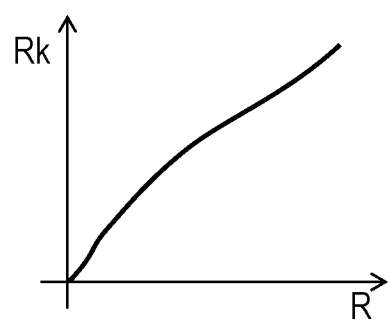
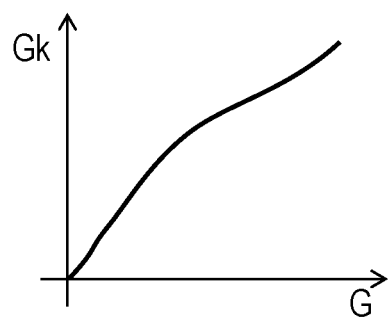
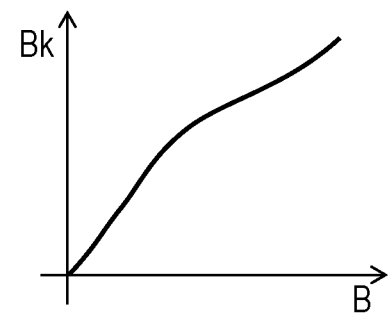

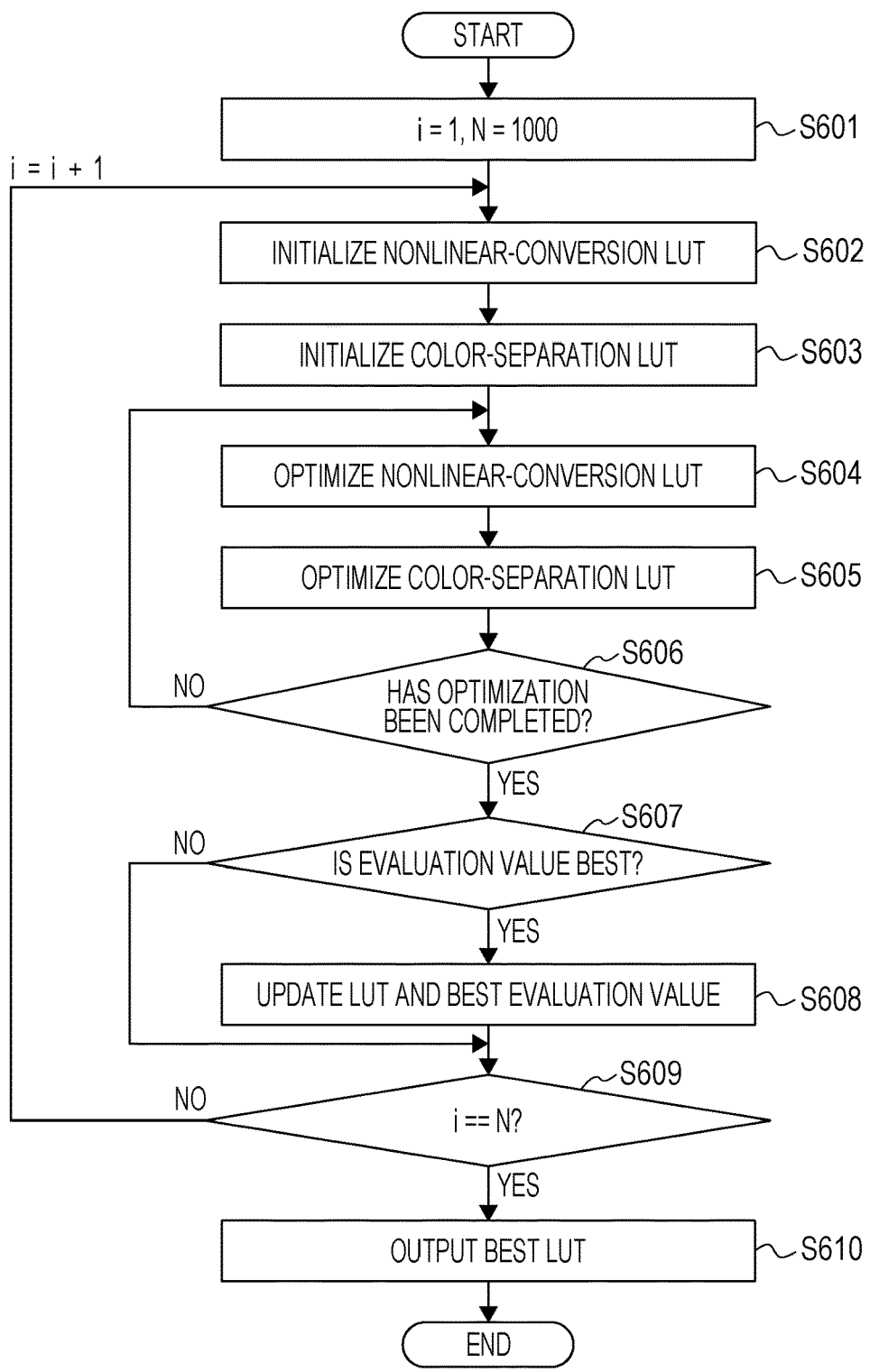

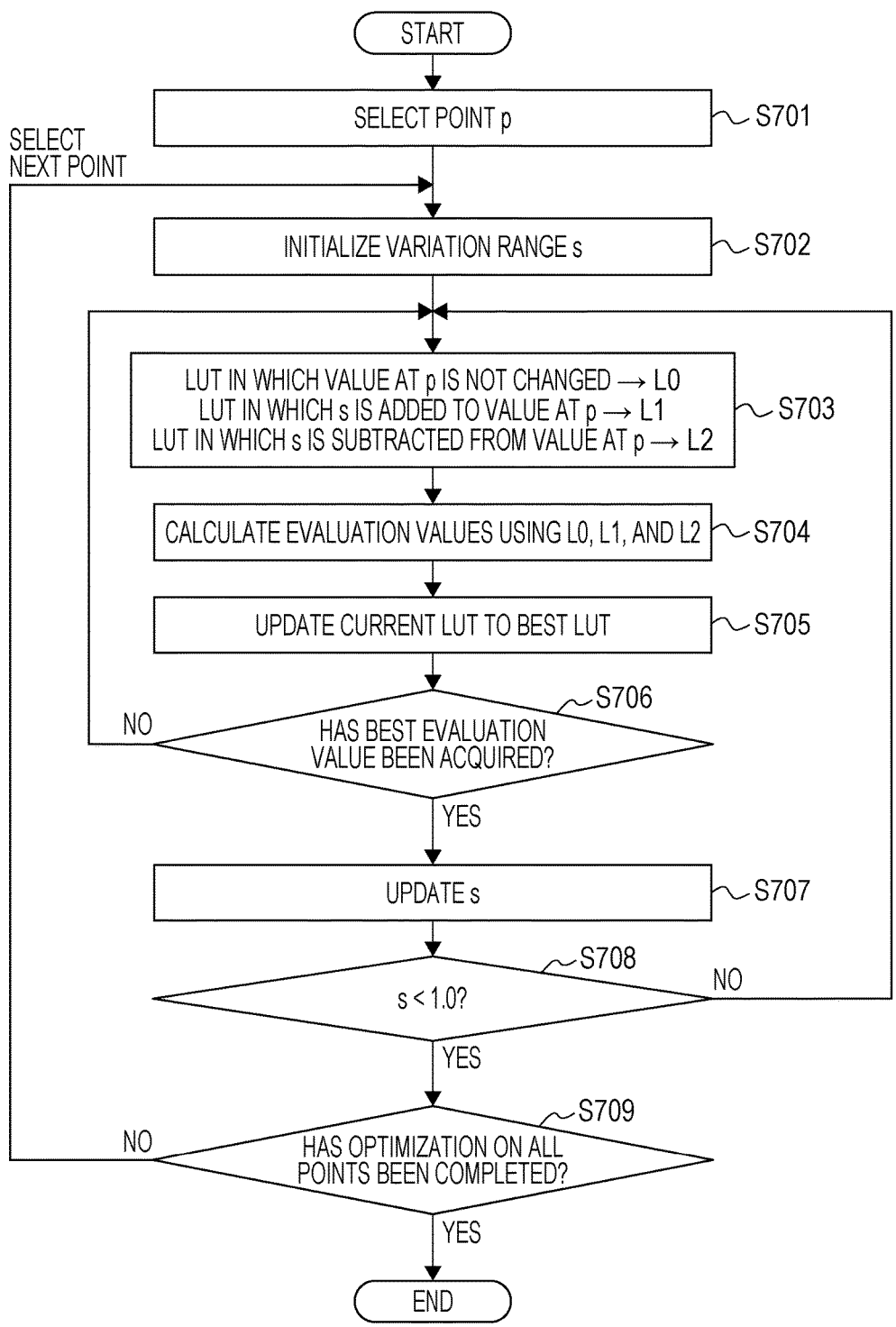

FIG. 14B
1055
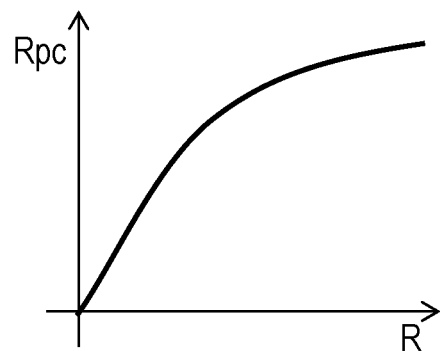
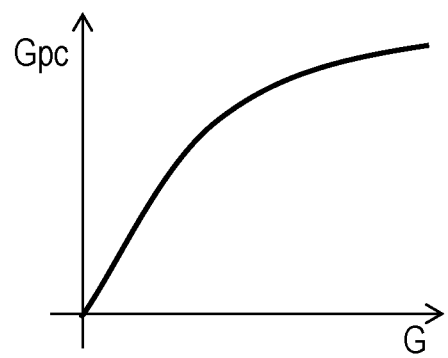
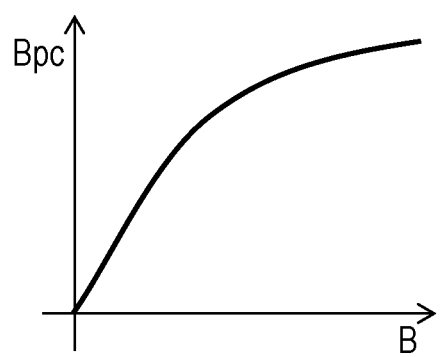

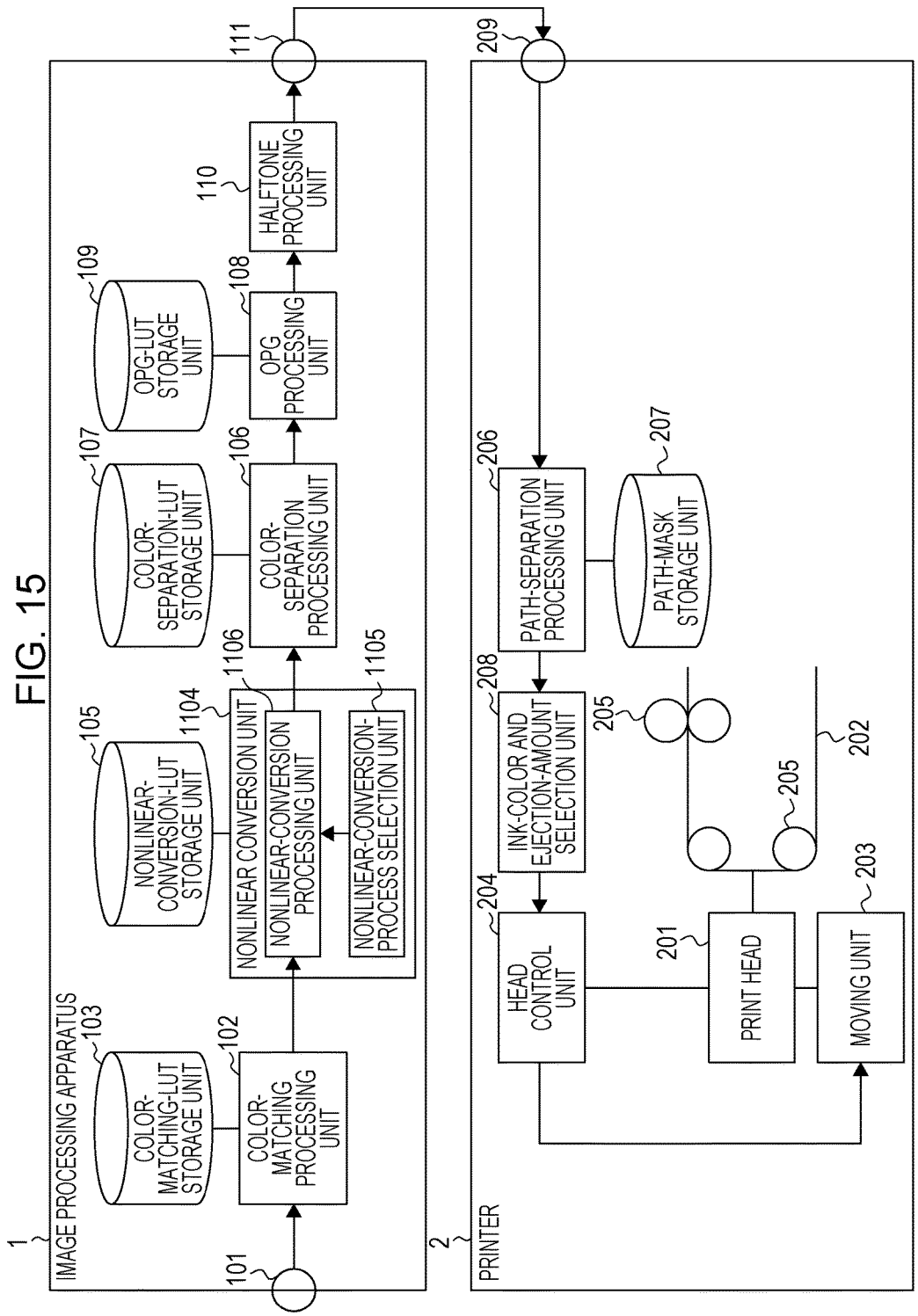

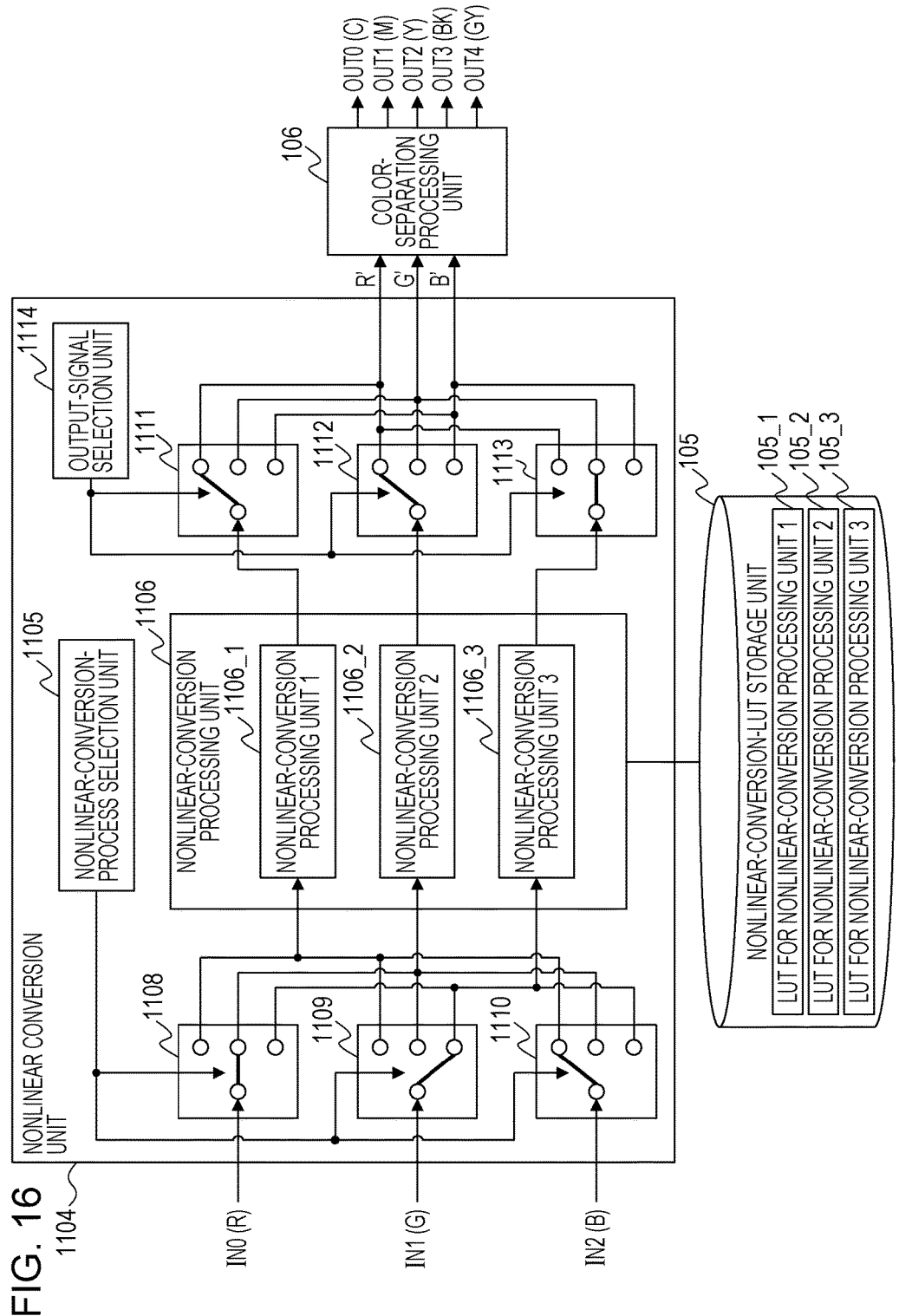

FIG. 18A
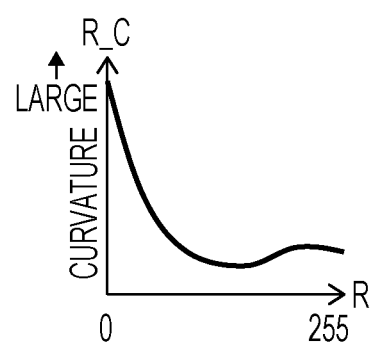
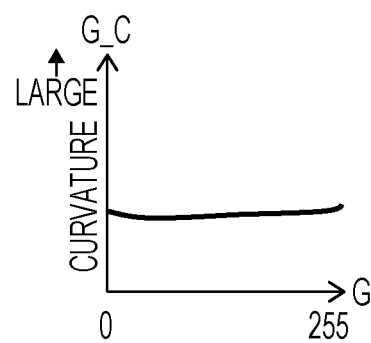
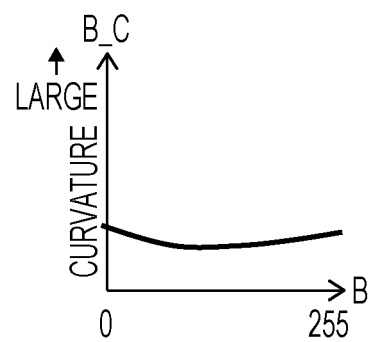

FIG. 18B
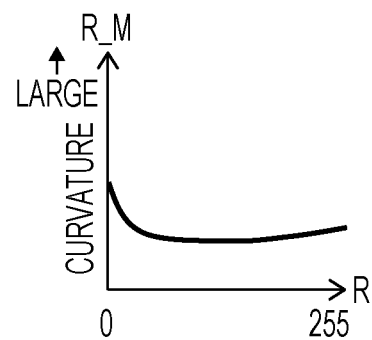
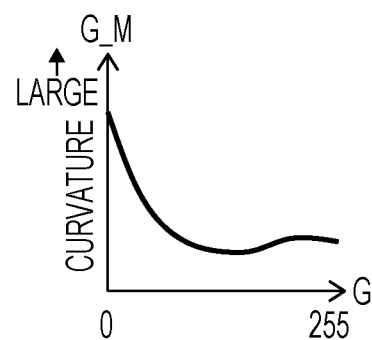
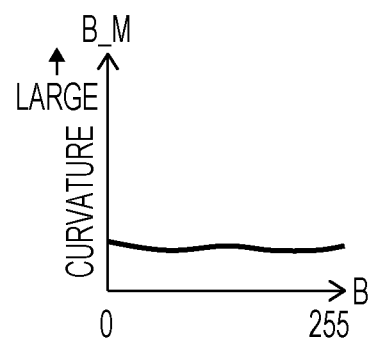

FIG. 18C
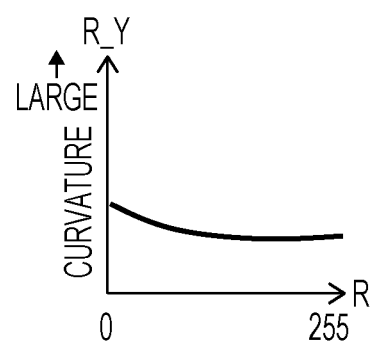
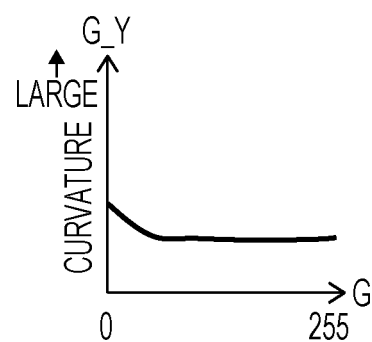
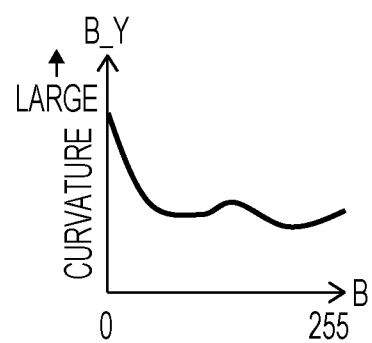

FIG. 18D
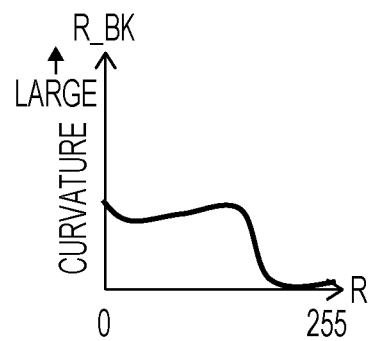
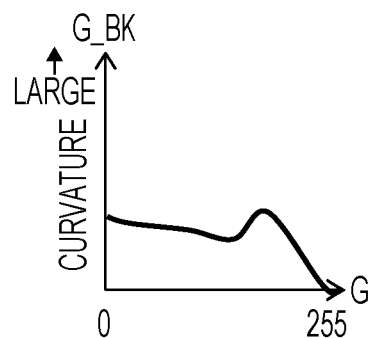
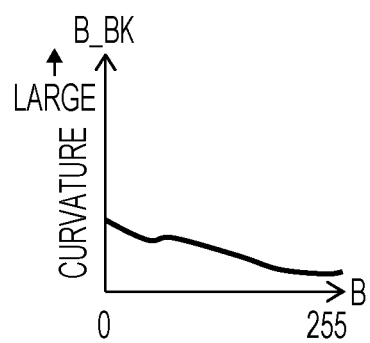

FIG. 18E
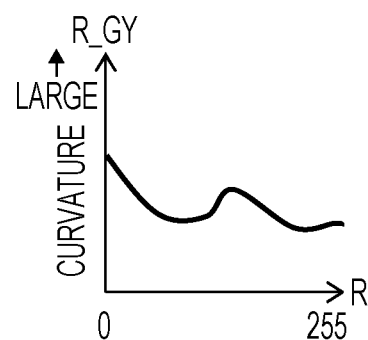
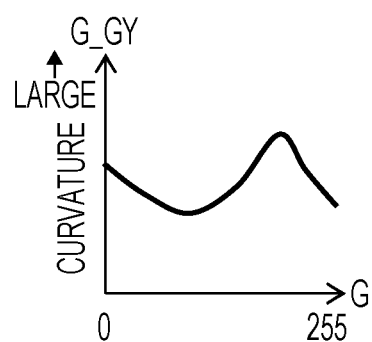
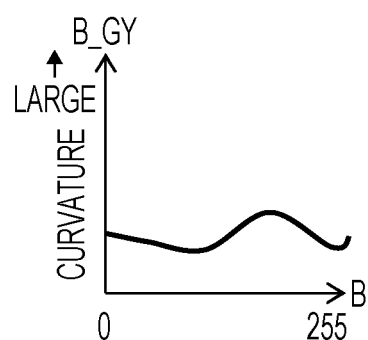

FIG. 19

| NONLINEAR CONVERSION UNIT GROUP NO. g | INPUT SIGNAL k TO NONLINEAR CONVERSION UNIT (INPUT SIGNAL_INK COLOR) | INPUT-OUTPUT CHARACTERISTICS |
|---|---|---|
| 1 | R_C<br>G_M, G_Y<br>B_Y, B_BK | CURVATURE OF DARK TO HALFTONE PORTION IS RELATIVELY LARGE |
| 2 | R_BK, R_GY<br>G_BK, G_GY<br>B_GY | CURVATURE OF HALFTONE TO BRIGHT PORTION IS RELATIVELY LARGE |
| 3 | R_M, R_Y<br>G_C,<br>B_C, B_M | CHANGE IN CURVATURE IS SMALL AS A WHOLE |

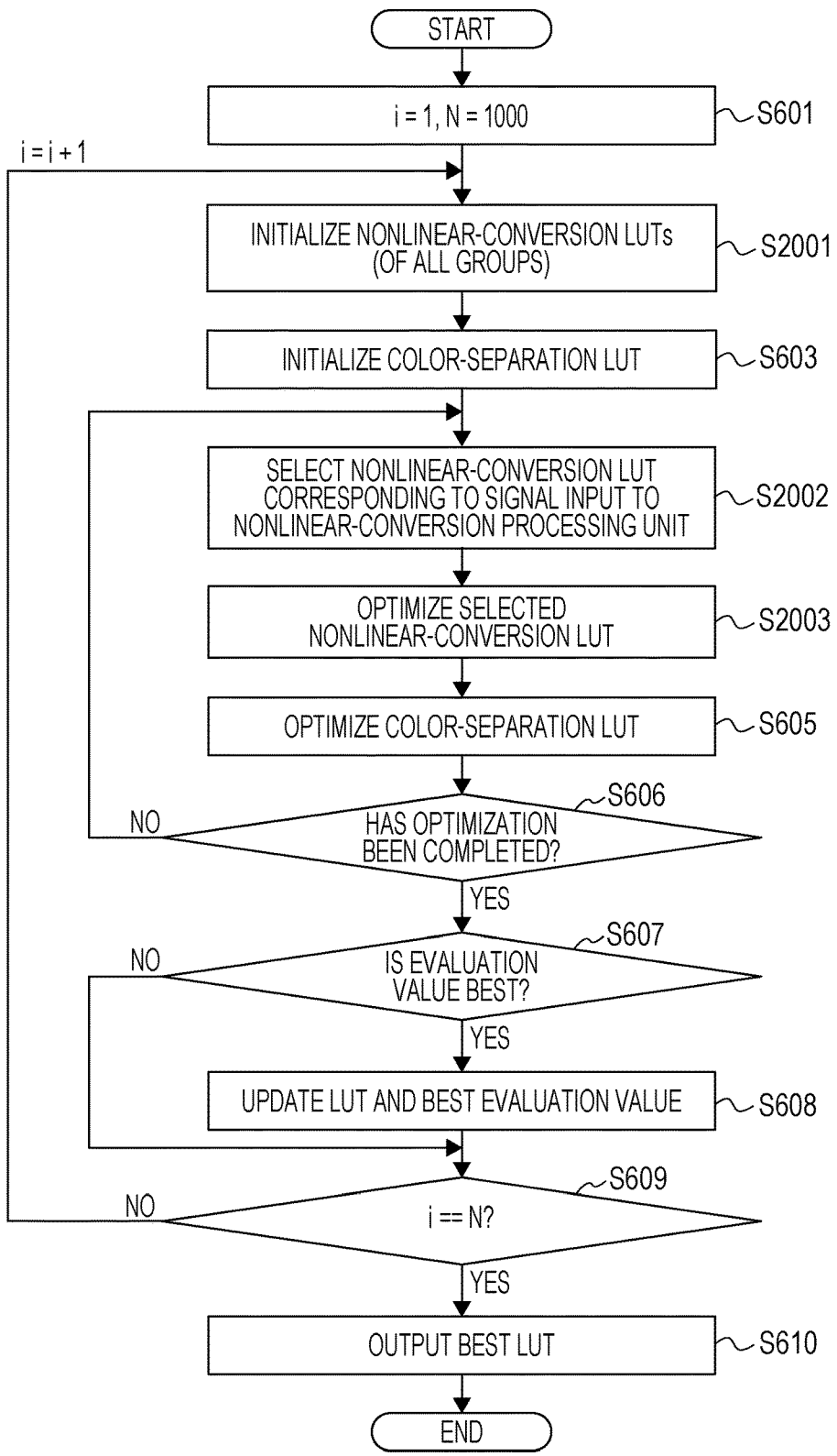

FIG. 22

| GROUPING CANDIDATE NO. | INPUT SIGNAL | | | | | | | | | | | | | | | |
|---|---|---|---|---|---|---|---|---|---|---|---|---|---|---|---|---|
| | R_C | R_M | R_Y | R_BK | R_GY | G_C | G_M | G_Y | G_BK | G_GY | B_C | B_M | B_Y | B_BK | B_GY |
| No.1 | 1 | 3 | 3 | 2 | 2 | 3 | 1 | 1 | 2 | 2 | 3 | 3 | 1 | 1 | 2 |
| No.2 | 1 | 3 | 1 | 2 | 2 | 3 | 1 | 1 | 2 | 2 | 3 | 3 | 1 | 1 | 2 |
| No.3 | 1 | 1 | 1 | 1 | 1 | 2 | 2 | 2 | 2 | 2 | 3 | 3 | 3 | 3 | 3 |
| No.4 | 1 | 1 | 1 | 1 | 1 | 1 | 1 | 2 | 2 | 3 | 3 | 3 | 3 | 3 | 3 |
| ... | ... | ... | ... | ... | ... | ... | ... | ... | ... | ... | ... | ... | ... | ... | ... |

NUMBERS INDICATE GROUP NUMBER g

WITHOUT PREPROCESSING

REVERSING INPUT VALUE

CHANGING SCALE OF INPUT VALUE

SHIFTING INPUT VALUE

NONLINEAR-CONVERSION LUT

APPARATUS, METHOD, AND PROGRAM FOR PROCESSING IMAGE

TECHNICAL FIELD

The present disclosure relates to image processing for converting image signals to output signals including signals corresponding to a plurality of color components that an output device deals with.

BACKGROUND ART

Printers typified by ink jet printers and electrophotographic printers generally generate print data by receiving RGB color signals as input and converting the signals to signals indicating the color components of color materials (cyan [C], magenta [M], yellow [Y], and black [K]) equipped in the printers. This conversion is called color separation processing. One mainstream method employs a combination of a three-dimensional look-up table (LUT) and interpolation operation.

The three-dimensional LUT generally stores only values on grid points in an input color space, which are thinned out to about 17×17×17. Values between the grid points are calculated by interpolation operation. The interpolation operation can cause an error, leading to a decrease in the accuracy of color reproduction between the grid points.

PTL 1 and PTL 2 disclose techniques for reducing a decrease in accuracy due to interpolation operation by increasing linearity in interpolation operation with a three-dimensional LUT by using a one-dimensional LUT for performing nonlinear conversion before using the three-dimensional LUT. These techniques are recognized as techniques for appropriately linearly converting input signals to improve the accuracy of interpolation operation using a multidimensional LUT. Specifically, PTL 1 discloses a technique for nonlinear conversion using a one-dimensional LUT corresponding to one kind of input signal. PTL 2 discloses a technique for nonlinear conversion using different one-dimensional LUTs for different kinds of values input to a three-dimensional LUT, that is, different channels of red (R), green (G), and blue (B).

However, the nonlinear conversion for enhancing the linearity of interpolation operation using a multi-dimensional LUT depends on not only the kinds of values (for example, RGB) input to the multi-dimensional LUT but also the kinds of values (for example, CMYK) output from the multi-dimensional LUT. For this reason, the configuration in which only nonlinear conversion LUTs (one-dimensional LUTs) corresponding to input signals is provided needs further improvement to reduce a decrease in the accuracy of color reproduction due to an interpolation error. In particular, an ink-jet printer equipped with pale-color ink, which is lower in density than dark ink, significantly differs in nonlinearity between the pale ink, which is frequently used for a light region, and the dark ink, which is frequently used for a dark region.

CITATION LIST

Patent Literature

PTL 1: Japanese Patent Laid-Open No. 2003-110865
PTL 2: Japanese Patent Laid-Open No. 2014-187604

SUMMARY OF INVENTION

The present disclosure reduces a decrease in accuracy due to interpolation operation even if the nonlinearity of values output from a multi-dimensional LUT differs according to the kind of values output from the multi-dimensional LUT.

An image processing apparatus according to an aspect of the present disclosure is an image processing apparatus that converts image signals indicating an image to output signals including signals corresponding to individual color components that an output device deals with by interpolation processing using a look-up table. The apparatus includes a first conversion unit and at least one second conversion unit. The first conversion unit converts the image signals to image signals corresponding to linearity of the signals corresponding to the individual color components. The at least one second conversion unit converts the image signals converted by the first conversion unit to the output signals by the interpolation processing.

Further features of the present invention will become apparent from the following description of exemplary embodiments with reference to the attached drawings.

BRIEF DESCRIPTION OF DRAWINGS

FIG. 2A is a graph showing an example of a conversion LUT.

FIG. 2B is a graph showing an example of a conversion LUT.

FIG. 2C is a graph showing an example of a conversion LUT.

FIG. 2D is a graph showing an example of a conversion LUT.

FIG. 6 is an overall view of a flowchart for designing conversion LUTs and color separation LUTs.

FIG. 7 is a flowchart for designing conversion LUTs and color separation LUTs. (optimization processing)

FIG. 14B is a graph of a conversion LUT for a pale ink.

FIG. 15 is a block diagram illustrating the configuration of an image forming apparatus according to a sixth embodiment.

FIG. 16 is a block diagram illustrating the details of the configuration of a nonlinear conversion unit.

FIG. 18A is a graph showing the curvature of a color separation LUT.

FIG. 18B is a graph showing the curvature of a color separation LUT.

FIG. 18C is a graph showing the curvature of a color separation LUT.

FIG. 18D is a graph showing the curvature of a color separation LUT.

FIG. 18E is a graph showing the curvature of a color separation LUT.

FIG. 19 is a table in which signals input to a nonlinear-conversion processing unit are sorted according input and output characteristics.

FIG. 20 is a flowchart for creating conversion LUTs and color separation LUTs according to the sixth embodiment.

FIG. 22 is a table showing an example of a plurality of grouping candidates and input signals corresponding to the candidates.

DESCRIPTION OF EMBODIMENTS

Embodiments of the present disclosure will be described hereinbelow with reference to the drawings. It is to be understood that the embodiments below do not limit the present disclosure and that not all combinations of features described in the embodiments are essential for the present disclosure. Like configurations are given like reference signs.

First Embodiment

A three-dimensional look-up table (LUT) holds input values (for example, RGB image signals) and output values (signals corresponding to individual color components that an output device deals with, such as CMYK) in association with the colors indicated by the values. This embodiment shows an example in which a decrease in accuracy due to interpolation operation (in this embodiment, interpolation processing) is reduced using different one-dimensional LUTs according the kinds of input values and output values.

Apparatus Configuration 1

Figure 1:
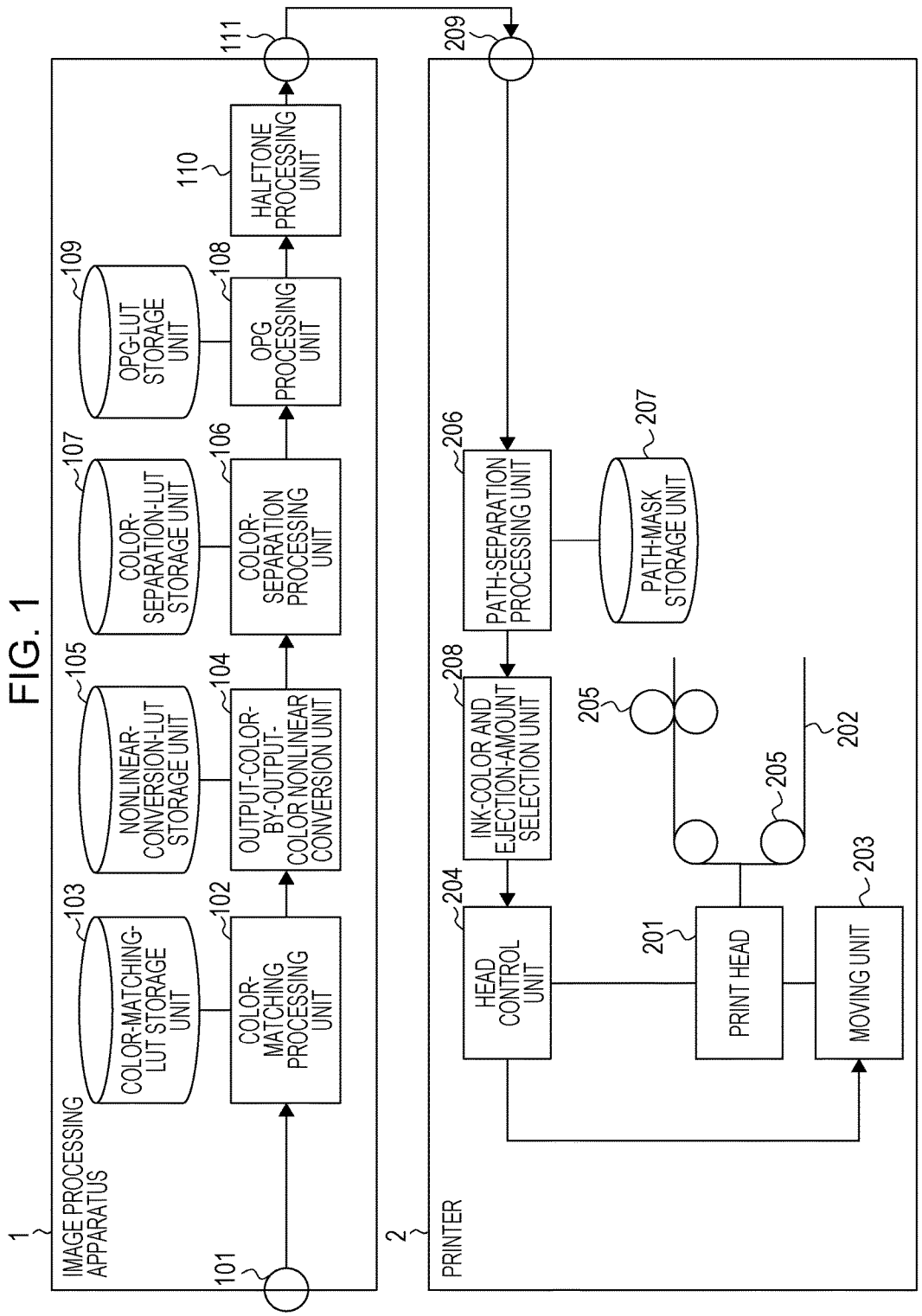
FIG. 1 is a block diagram illustrating the configuration of an image forming apparatus according to a first embodiment of the present disclosure.
Figure 3A:
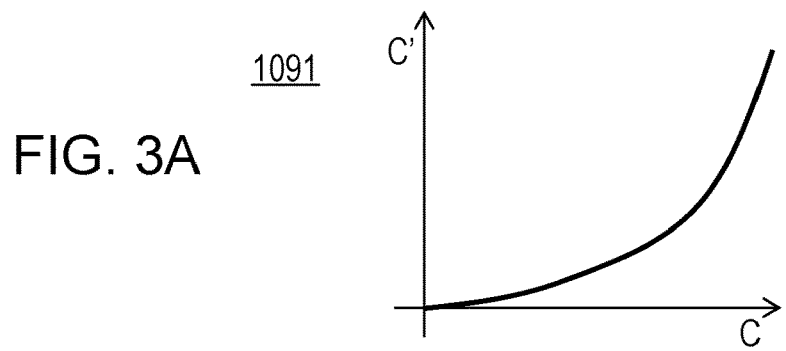
FIG. 3A is a graph showing an example of a OPG-LUT.
Figure 3B:
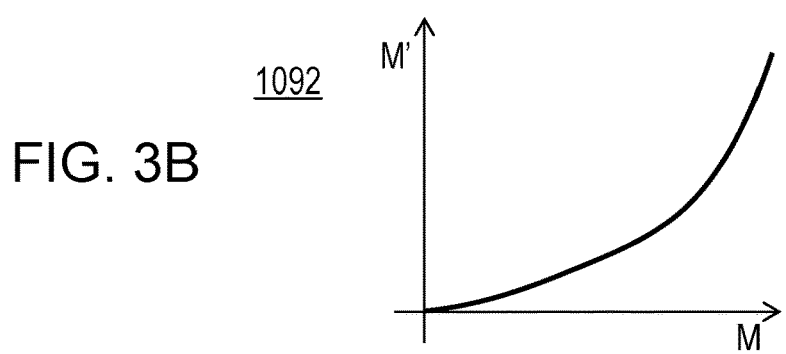
FIG. 3B is a graph showing an example of a OPG-LUT.
Figure 3C:
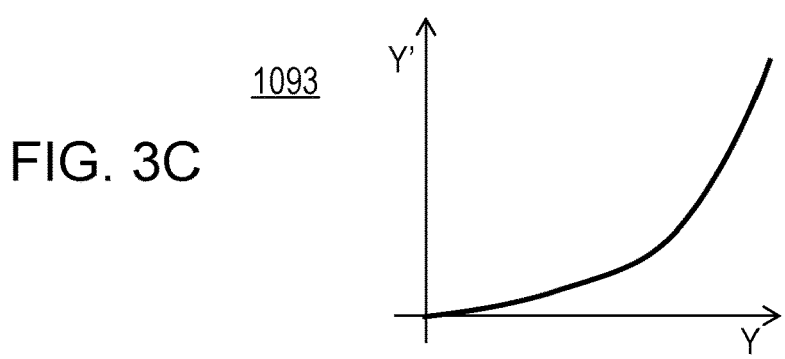
FIG. 3C is a graph showing an example of a OPG-LUT.
Figure 3D:
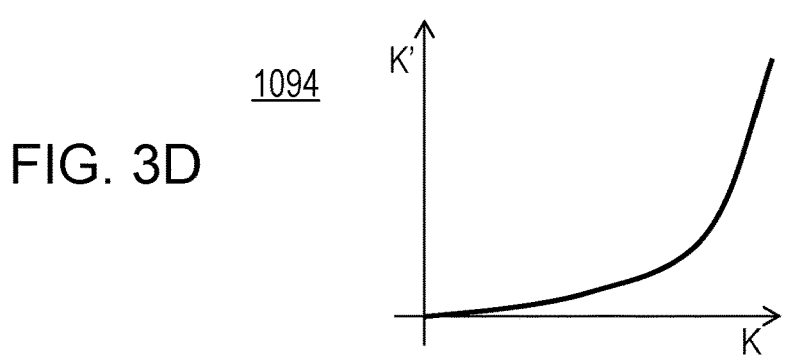
FIG. 3D is a graph showing an example of a OPG-LUT.

FIG. 1 is a block diagram illustrating the configuration of an image forming apparatus according to this embodiment. In FIG. 1, the image processing apparatus 1 is connected to a printer 2 via a printer interface or a circuit. One example of the image processing apparatus 1 is a printer driver installed in a general personal computer. In this case, the components of the image processing apparatus 1 described below are implemented by executing predetermined programs stored in a memory (for example, a read-only memory [ROM]) with a computer. In another configuration example of the image processing apparatus 1, the printer 2 accommodates the image processing apparatus 1.

The image processing apparatus 1 inputs image data indicating an image to be printed via an image-data input terminal 101 and transmits the image data to an output-color-by-output-color nonlinear conversion unit 104 (hereinafter also referred to as "conversion unit 104"). The image data is color image data including, for example, 8-bit RGB image signals.

A color-matching processing unit 102 (hereinafter also referred to as "processing unit 102") performs a color matching process on the input image data to correct the color of the RGB image. The color matching process allows unified color reproduction even with a printer or a printing medium having different color reproduction characteristics. In performing the color matching process, the color-matching processing unit 102 refers to three-dimensional color matching LUTs stored in a color-matching-LUT storage unit 103. In each color matching LUT, R, G, or B values are described only on grid points in which each of 8-bit RGB is thinned out to 17×17×17 points. Values between the grid points are calculated by linear interpolation.

The conversion unit 104 performs nonlinear conversion on the image data subjected to the color matching process. The nonlinear conversion processing is performed for each data on ink colors of the printer 2. In this embodiment, ink of four colors: cyan (C), magenta (M), yellow (Y), and black (K), are provided on a print head 201. In the nonlinear conversion processing, the conversion unit 104 refers to nonlinear conversion LUTs (hereinafter also referred to as "conversion LUTs") for use in one-dimensional nonlinear conversion processing, stored in a nonlinear-conversion-LUT storage unit 105 (hereinafter referred to as "storage unit 105"). FIGS. 2A to 2D illustrate examples of the conversion LUTs. The graphs in FIGS. 2A to 2D show input RGB values on the horizontal axis and RGB values subjected to nonlinear conversion on the vertical axis. LUTs 1051 to 1054 are conversion LUTs respectively corresponding to C, M, Y, and K, in which converted values corresponding to 8-bit (256 gray levels) input data are described on only 17 grid points. Values between the grid points are calculated by linear interpolation. A method for creating the conversion LUTs will be described later.

A color-separation processing unit 106 generates 8-bit ink value images of four planes corresponding to the inks of four colors of the printer 2 from the image data corrected by the conversion unit 104. In color separation processing, the color-separation processing unit 106 refers to three-dimensional color separation LUTs stored in a color-separation-LUT storage unit 107. Each color separation LUT describes the values of one of four color inks on only the grid points thinned out to 17×17×17. Values between the grid points are calculated by linear interpolation.

In this embodiment, color separation LUTs with 17×17×17 grid points are created for use on the basis of color separation LUTs with 33×33×33 grid points designed in advance. A method for creating the color separation LUTs will be described later.

An output gamma (OPG) processing unit 108 performs a gamma correction process on an ink value image created by the color-separation processing unit 106. When performing the gamma correction process, the OPG processing unit 108 refers to one-dimensional OPG LUTs stored in an OPG-LUT storage unit 109. FIGS. 3A to 3D illustrate examples of the OPG-LUTs, 1091 to 1094. The graphs in FIGS. 3A to 3D show CMYK values subjected to the color separation processing on the horizontal axis and CMYK values subjected to the OPG processing on the vertical axis. Each of the OPG LUTs 1091 to 1094 describes corrected values corresponding to 8-bit (256 gray levels) data. In the OPG LUTs 1091 to 1094, ink values are set in advance for individual ink kinds so that when printing is performed using only inks of CMYK, the lightness of the print changes linearly with respect to the signal values of the ink value image. A value for evaluating the lightness is L* defined by CIE (L*, a*, b*) (CIELAB).

A halftone processing unit 110 performs quantization processing for converting a color ink value image acquired by the OPG processing unit 108 to a binary image (or an image of 1 bit or more with levels of gray lower than the level of gray of the input image). A known dither matrix method is used to perform halftone processing. The binary image data generated by the halftone processing unit 110 is output to the printer 2 via an output terminal 111.

The printer 2 moves a print head 201 in the horizontal and vertical directions relative to a printing medium 202, thereby printing binary image data formed by the image processing apparatus 1 on the printing medium 202. This embodiment uses an ink-jet print head 201. The print head 201 includes a plurality of printing elements (nozzles). The print head 201 includes a plurality of printing elements (nozzles). In this embodiment, the print head 201 is equipped with inks of four colors: cyan (C), magenta (M), yellow (Y), and black (K). A moving unit 203 moves the print head 201 under the control of a head control unit 204. A conveying unit 205 conveys the printing medium 202 under the control of the head control unit 204. This embodiment employs a multi-path printing method for forming an image by performing a plurality of scans on the printing medium 202 with the print head 201.

Figure 4:
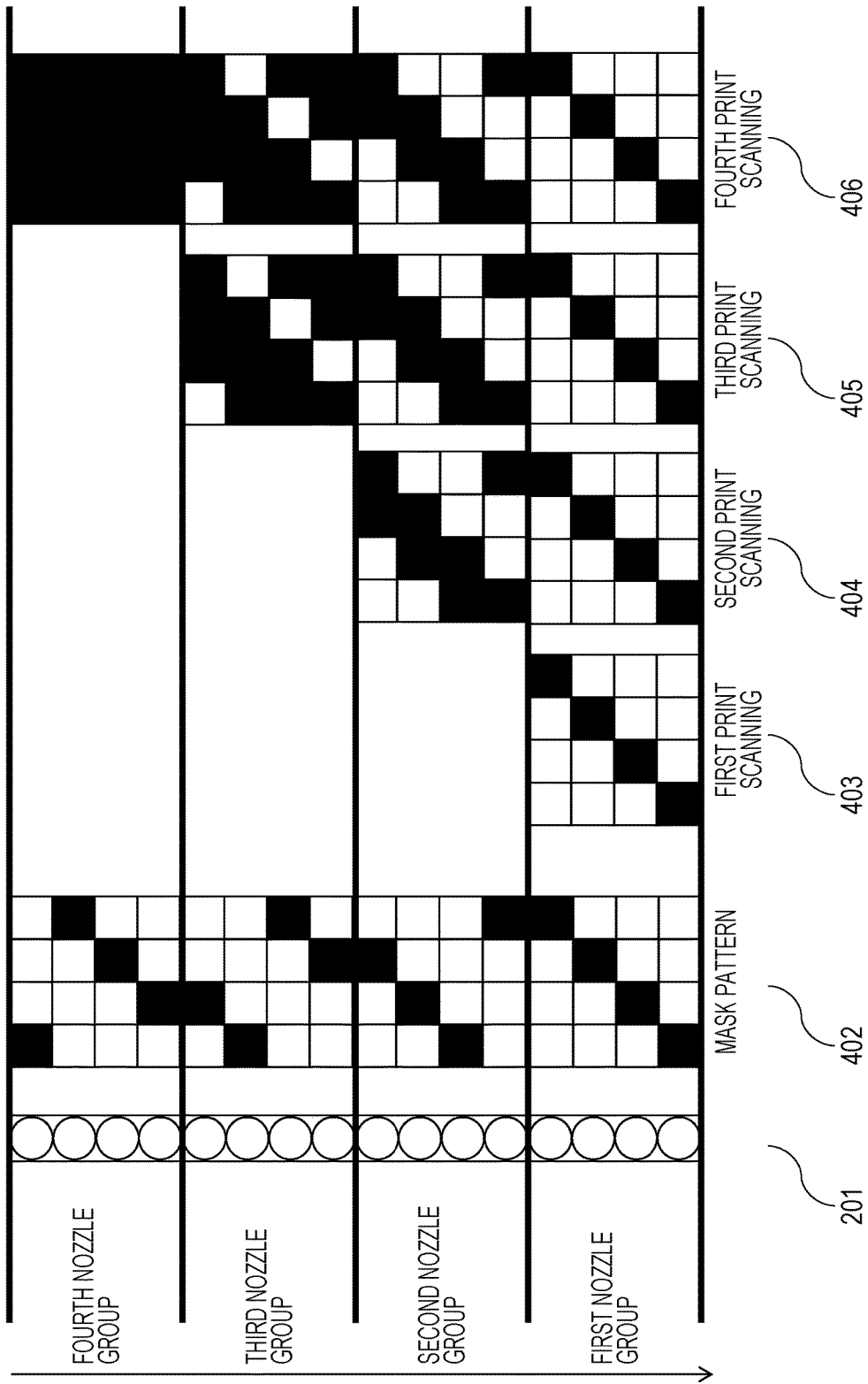
FIG. 4 is a conceptual diagram of path separation processing.

A path-separation processing unit 206 generates scan data on individual colors on the basis of the color binary image data formed by the image processing apparatus 1 and a path mask acquired from a path-mask storage unit 207. FIG. 4 schematically shows the print head 201 and a print pattern for describing the multipath printing method. Although a general print head includes about 768 nozzles, the print head 201 includes 16 nozzles for ease of illustration. The nozzles are divided into four nozzle groups: first to fourth groups, as shown in FIG. 4. Each group includes four nozzles. Black areas of a mask pattern 402 indicates areas to be printed using the nozzles. Patterns that the individual nozzle groups print are complementary to one another. Superposing the patterns completes printing of a region corresponding to the 4×4 areas. Patterns 403 to 406 illustrate the process of forming an image by repeating print scanning Every time the print scanning ends, the printing medium 202 is conveyed in the direction of arrow in FIG. 4 by the width of each nozzle group. This embodiment is described using an area of 4×4 for the sake of simplicity. For example, for a print head including 768 nozzles, a mask pattern (mask data) with a length of 768 areas divided by the number of print paths and a width of 256 areas is generally used.

An ink-color and ejection-amount selection unit 208 selects an ink color from ink colors provided for the print head 201 on the basis of the scan data.

Image Forming Process 1

Referring next to the flowchart in FIG. 5, the process steps of the image forming process performed by the image processing apparatus 1 of this embodiment will be described.

First, image data is acquired via the image-data input terminal 101 (S501).

Next, the processing unit 102 performs a color matching process on the image data acquired at S501 (S502). When performing the color matching process, the processing unit 102 refers to a three-dimensional color matching LUT stored in the color-matching-LUT storage unit 103.

Next, the conversion unit 104 initializes the kind of output color to be converted (S503). The initial ink kind is set as cyan. Next, the conversion unit 104 acquires the ink kind set at S503 (S504) and acquires a conversion LUT corresponding to the ink kind acquired at S504 from the storage unit 105 (S505). Here, the conversion unit 104 acquires the LUT 1051 corresponding to cyan.

Next, the conversion unit 104 converts the image signal subjected to the color matching process at S502 to an image signal corresponding to the characteristic of a change in the value of each signal corresponding to the color component of the output signal (for example, linearity) using the conversion LUT acquired at S505 to perform nonlinear conversion processing for each ink color (S506). Here, the conversion unit 104 converts the image signal to an image signal corresponding to the linearity of cyan.

Next, the color-separation processing unit 106 generates an ink value image from the image data converted at S506 (S507). When performing the color separation processing, the color-separation processing unit 106 refers to the three-dimensional color separation LUT stored in the color-separation-LUT storage unit 107. Here, an ink value image corresponding to cyan is generated.

Next, the OPG processing unit 108 performs gamma correction processing on the ink value image generated at S507 (S508). Here, a one-dimensional OPG LUT corresponding to the cyan ink value image is applied. The values in the cyan OPG LUT are set in advance so that the lightness of a print printed using only a cyan ink changes linearly with respect to the signal values of the ink value image.

Next, it is determined whether all the processes to the OPG processing have been completed for all ink kinds (S509). If yes, the process goes to S510. If not, the process returns to S504 for the next ink color. In this embodiment, the process is performed in the order of cyan, magenta, yellow, and black, although it may be performed in another order.

The halftone processing unit 110 performs halftone processing for converting the image data subjected to the OPG processing at S508 to binary data (S510). The binary image data subjected to the halftone processing is output in any size, such as an entire image or a size corresponding to the width of each printing unit area, via the output terminal 111.

The printer 2 receives the half-tone image data processed at S510 via an input terminal 209 and transmits the image data to the path-separation processing unit 206. The path-separation processing unit 206 performs path separation processing for converting the image data to scan data (S511).

Next, an ink color and an ejection amount corresponding to the scan data converted at S511 are selected by the ink-color and ejection-amount selection unit 208 tor start image formation (S512). In the image formation, the print head 201 drives the nozzles at fixed driving intervals while moving relative to the printing medium 202 to print an image on the printing medium 202. The printing medium 202 is conveyed by a predetermined amount for each scan to form an entire image. Thus, a series of image forming process is complete.

Method for Creating Nonlinear Conversion LUT and Color Separation LUT

A method for creating a conversion LUT and a color separation LUT according to this embodiment will be described hereinbelow. In this embodiment, a conversion LUT with 17 grid points and a color separation LUT with 17×17×17 grid points are created on the basis of a color separation LUT with 33×33×33 grid points designed in advance.

FIG. 6 is an overall view of a flowchart for the creation processing according to this embodiment. First, a loop count i and the upper limit of the loop count, N, are set (S601), where i is 1, and N is initialized at 1,000.

Next, the conversion LUT is initialized (S602). In the initialization, the positions and values of the 17 grid points of the conversion LUT are set. The grid points are spaced at equal intervals, that is, 17 points: 0, 16, 32, . . . , 240, and 255. The values of the grid points are initialized to random numbers from 0 to 255. Note that the values of the grid points are set to increase monotonously with respect to the positions of the grid points.

Next, the color separation LUT is initialized (S603). In the initialization, the values of the 17×17×17 grid points of the color separation LUT are set. In this embodiment, the initialization is performed by thinning out a color separation LUT with 33×33×33 grid points designed in advance.

Next, the nonlinear LUT initialized at S602 is optimized (S604). The details of the optimization will be described later.

Next, the color separation LUT initialized at S603 is optimized (S605). The details of the optimization will be described later.

Next, it is determined whether the optimization at S604 and S605 is complete (S606). If an optimization evaluation value E ceases changing from the previous loop (i−1), it is determined that the optimization is complete. The optimization evaluation value E is the sum of squares of the difference between the values of the LUT with 33×3×33 grid points and the values of 33×33×33 grid points calculated using the LUT with 17×17×17 grid points subjected to nonlinear conversion. If the optimization is not complete, the process returns to S604, and if the optimization is complete, the process goes to S607.

Next, it is determined whether the optimization evaluation value E acquired at the ith loop is the best evaluation value (S607). If the optimization evaluation value E is the best evaluation value, the process goes to S608. If not, the process goes to S609.

At S608, the nonlinear LUT and the color separation LUT acquired at the ith loop are stored as the best LUTs. The best evaluation values are updated.

At S609, it is determined whether the loop count i has reached the upper limit N. If not, 1 is added to i, and the process returns to S602. If yes, the best LUTs are output (S610), and the process ends.

Performing the above process for each of CMYK inks creates conversion LUTs and color separation LUTs.

Method for Optimizing LUT

FIG. 7 is a flowchart for optimization of LUTs at S604 and S605. In both cases, the following common process is performed.

First, one point p to be optimized first is selected from the grid points of the LUT (S701). For the conversion LUT, a point at position 0 is selected. For the color correction LUT, a point at position (0, 0, 0) is selected.

Next, a value s is initialized (S702). where s is a parameter indicating a variation range in optimization. In this embodiment, s is initialized at 8.

Next, the value at point p is changed to form three kinds of LUT: L0, L1, and L2 (S703), where L0 is a value that undergoes no change, L1 is the value at p plus s, and L2 is the value at p minus s.

Next, evaluation values E0, E1, and E2 when L0, L1, L2 are respectively used are calculated (S704). Each evaluation value is the sum of squares of the difference between the values of the LUT with 33×33×33 grid points and the values of 33×33×33 points calculated using a LUT with 17×17×17 grid points subjected to nonlinear conversion. In other words, the fewer the errors, the smaller the evaluation value, and therefore the smallest value of the evaluation values E0, E1, and E2 is used as the best evaluation value.

Next, the evaluation values E0, E1, and E2 are compared to update the current LUT to a LUT with the best evaluation value (S705).

Next, it is determined whether the best evaluation value has been acquired (S706) A criterion for the determination is that the best evaluation value acquired by comparison at S705 is the evaluation value E0 that is not changed. If the best evaluation value has not been acquired, the process returns to S703, and if acquired, the process goes to S707.

Next the change range s is updated (S707). In this embodiment, a value obtained by dividings by 2 is a new value of s.

Next, it is determined whether s is less than 1 (S708). If s is equal to or greater than 1, the process returns to S703, and if s is less than 1, the process goes to S709.

Next, it is determined whether optimization has been completed for all the points (S709). If not, the next point is selected, and the process returns to S702. If yes, the process ends.

Advantageous Effects 1

Figure 8A:
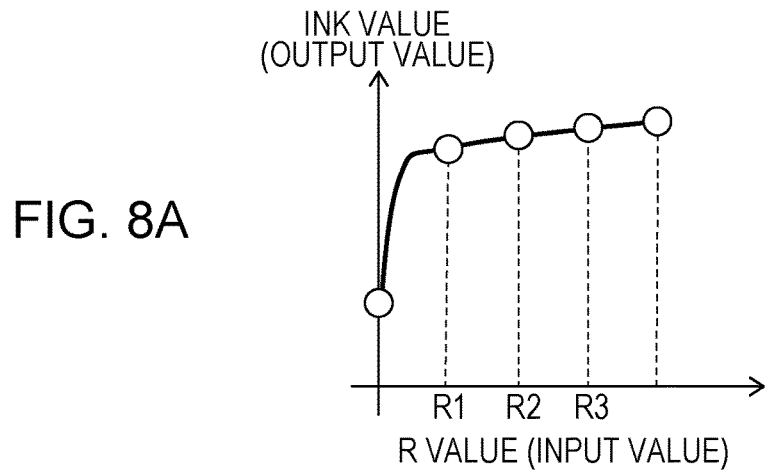
FIG. 8A is a graph illustrating interpolation processing in a color separation LUT subjected to no nonlinear conversion.

The advantages of output-color-by-output-color nonlinear conversion according to this embodiment will be described hereinbelow. FIG. 8A is a graph illustrating interpolation processing in a color separation LUT subjected to no nonlinear conversion. The horizontal axis plots input values R, and the vertical axis plots output ink values. Although an actual color separation LUT inputs three-dimensional RGB and outputs four-dimensional CMYK, the input and output are individually shown in one dimension. The number of grid points on each axis of the color separation LUT is five for the sake of simplicity. The curve of FIG. 8A is an ink curve to be reproduced. Grid point positions R1, R2, and R3 are disposed at equal intervals, each of which has an ink value. Ink values between the grid points are calculated by linearly interpolating the ink values. A portion of the ink curve to be reproduced with high nonlinearity may cause a large interpolation error. In FIG. 8A, a portion in which the input value is smaller than R1 has high nonlinearity, thus causing a large interpolation error.

Figure 8B:
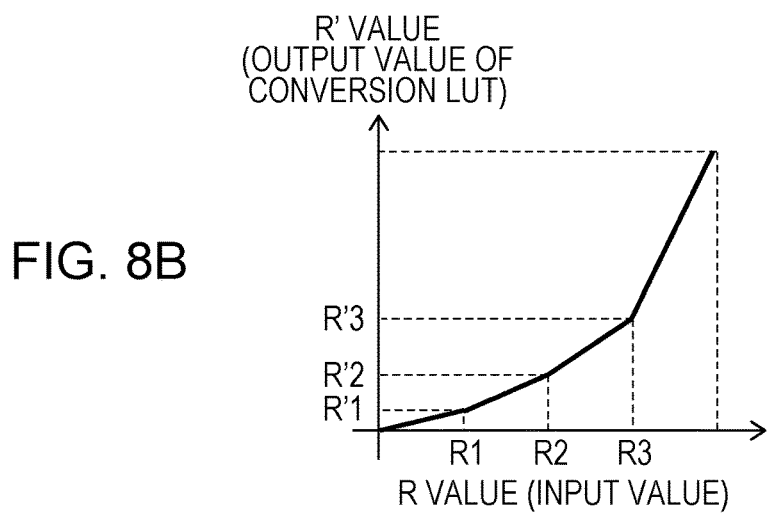
FIG. 8B is a graph illustrating one example of a conversion LUT.

FIG. 8B illustrates one example of the conversion LUT. The horizontal axis represents input R values, and the vertical axis represents R' values converted from the R values. The number of grid points of the conversion LUT is five for the sake of simplicity. Values R0, R1, and R2 are respectively converted to R'1, R'2, and R'3. Each R' values between the grid points is calculated by interpolating R' values at the grid points.

Figure 8C:
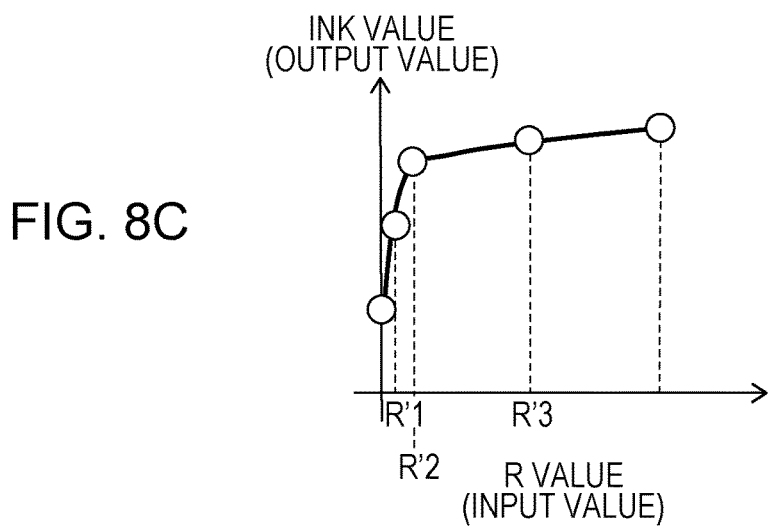
FIG. 8C is a graph illustrating the advantageous effect of nonlinear interpolation.

FIG. 8C is a graph illustrating interpolation processing in a color separation LUT when the nonlinear interpolation in FIG. 8B is used. Difference from FIG. 8A is that the grid point positions R1, R2, and R3 are respectively converted to R'1, R'2, R'3 by nonlinear conversion and are disposed at unequal intervals. This reduces interpolation errors even in the portion having a large interpolation error in FIG. 8A.

The nonlinear interpolation thus allows the grid points of the color separation LUT to be disposed at unequal intervals, thus improving the interpolation accuracy by appropriately disposing the grid points. For the ink curve indicating changes in ink value, the conversion LUT may have a maximum degree higher than the maximum degree of a curve that the output signal can represent, although they may be the same degree.

Note that the shape of the ink curve (a hypersurface for a three-dimensional LUT) differs among ink kinds. Therefore, a portion with high nonlinearity differs among ink kinds. Accordingly, appropriate grid point positions differ among ink kinds.

Figure 13A:
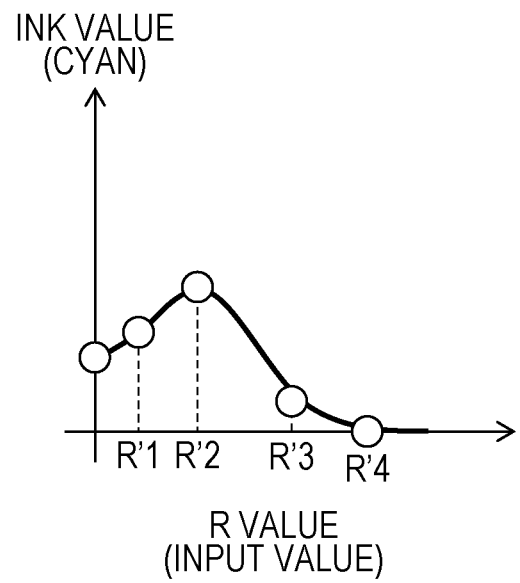
FIG. 13A is a graph of a color separation LUT for a cyan ink.
Figure 13B:
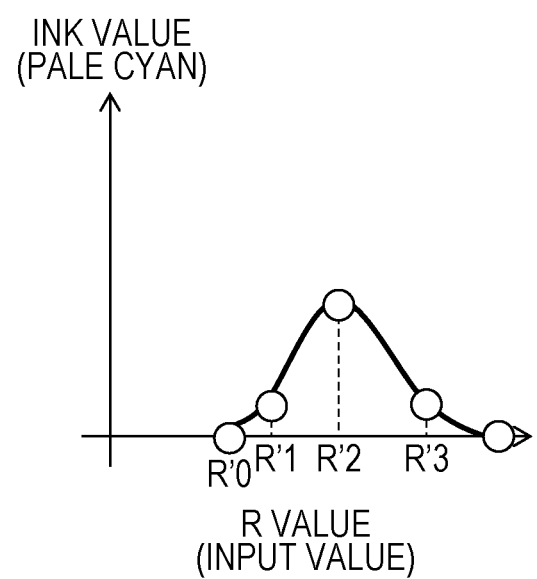
FIG. 13B is a graph of a color separation LUT for a pale ink.

This will be described using an example in which the printer 2 is equipped with relatively pale ink. FIGS. 13A and 13B respectively show graphs of a color separation LUT for a cyan ink and a color separation LUT for a pale cyan ink. The graphs are simplified for the sake of simplicity, as in FIGS. 8A to 8C.

Pale inks with low density are generally used to reduce the granularity of prints and are used only in light regions. For this reason, the ink values of the pale cyan ink in FIG. 13B are unevenly distributed to the right, which is a light region. In contrast, dark inks are often used in dark regions, and the ink values of the cyan ink in the graph of FIG. 13A are unevenly distributed to the left, which is a dark region.

The characteristics of ink values differ among ink kinds, as described above. For this reason, to reduce interpolation errors in color separation processing it is necessary, for pale inks, to dispose grid points closely in light regions, and for dark inks, to dispose grid points closely in dark regions. Thus, conversion LUTs for dark inks and conversion LUTs for pale ink exhibit different characteristics, as shown in FIGS. 14A and 14B.

Figure 14A:
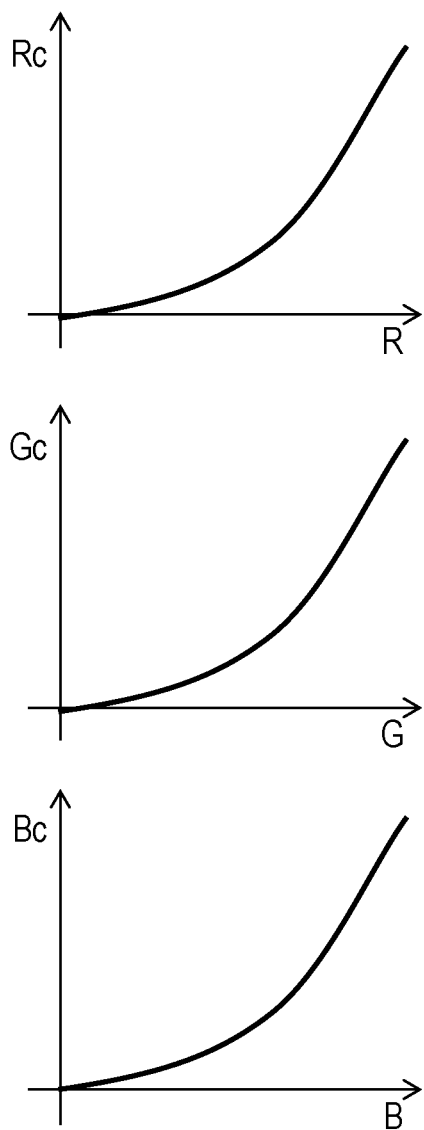
FIG. 14A is a graph of a conversion LUT for a cyan ink.

Referring to FIG. 14A, a LUT 1051 for cyan exhibits small inclination in a dark region (the left in the graph) and large inclination in a light region (the right in the graph). This characteristics cause the grid points in color separation processing to be close in the dark region. In contrast, a LUT 1055 for pale cyan exhibits large inclination in a dark region (the left in the graph) and small inclination in a light region (the right in the graph). This characteristics cause the grid points in color separation processing to be close in the light region.

Disposing the grid points of each ink in consideration of how each ink is used, as described above, is not achieved by switching the conversion LUTs according to only the kind of values (RGB) input to the color separation LUT, as in the related art. In particular, recent ink-jet printers have increased in the number of ink colors: four colors of CMYK, spot colors including red, pale colors, gray, and clear, which are used in different ways. Simply applying a common grid point disposition to all the ink colors would not make the most of the advantage of reducing interpolation errors.

This embodiment sufficiently reduces interpolation errors even if the characteristics of each ink kind differ.

As described above, this embodiment reduces a decrease in accuracy due to interpolation operation even if desired nonlinear conversion differs according to the kind of values output from a three-dimensional LUT.

Modifications 1

In the above embodiment, the print head 201 is equipped with inks of four colors:

cyan (C), magenta (M), yellow (Y), and black (K), although the kind of ink is not limited to the above kinds. For example, pale inks, spot-color inks, such as red and green, and a white ink may be used. In other examples, colorless and transparent clear inks and metallic inks may be used.

The present disclosure can also be applied to a configuration in which the amount of ink to be ejected by the print head 201 can be adjusted. Although the embodiment has a configuration in which the print head 201 has a plurality of nozzles in the paper conveying direction, the number and disposition of the nozzles are not limited to this configuration. For example, the print head 201 may include a nozzle train that ejects different amounts of ink of the same color, a plurality of nozzle trains that eject the same amount of ink, or a plurality of nozzles arranged in a zig-zag manner. The ink colors are arranged in the head moving direction, although they may be arranged in the paper conveying direction.

Although the image data is RGB color image data, the kind of an image that the image data indicates is not limited to the RGB color image but may be a monochrome image and a CMYK image. The image data and the output signals may contain a component other than color, for example, gloss information. In this case, the color separation LUT is a multi-dimensional LUT in four dimensions or more.

The number of bits and the number of grids of the nonlinear LUTs and the color separation LUTs are not limited to specific numbers. In particular, when the number of the grids of each nonlinear LUT is larger than the number of grits of each color separation LUT, the ink curve can be curved between the grid points of the color separation LUT. This enables pseudo nonlinear interpolation processing using a linear interpolation circuit, allowing better interpolation.

The first embodiment shows an example of a process using LUTs in nonlinear conversion processing and color separation processing (a table lookup process), although the nonlinear conversion processing may use another method other than the processing using LUTs. For example, mathematical calculation using a matrix or any mathematical expression may be used.

A method for designing the OPG is not limited to the above method. In addition to *linear, any designing methods using density linear or saturation linear, may be used.

Any method may be used to optimize the LUTs. For example, any method may be used to evaluate an error in optimization; for example, the greatest value of the error of ink values may be used. The error may be evaluated after the ink value is converted to a value in a uniform color space, such as L*a*b*. The smoothness of a change in ink value or L*a*b* may be used as an evaluation value. It is needless to say that an evaluation value in which the above values are combined may be used.

The upper limit N of the loop count, the initial value of the change range s, and a method for updating the value s is not limited to the above.

A dither matrix is used for the halftone processing performed by the halftone processing unit 108, although any method may be used for halftone processing. For example, a known error diffusion method may be used.

A path mask is used for the path separation processing in the path-separation processing unit 206, although any method for path separation processing may be used. For example, the present disclosure may be applied to a configuration in which the color-separation processing unit 104 generates multivalued images corresponding to the number of paths, and the halftone processing unit 108 binaries the multivalued images. The number of paths may be any number. Not the multipath method but a one-path printing method may be employed.

Second Embodiment

In the first embodiment, a method for creating conversion LUTs by optimization has been described. A second embodiment shows a simpler method for creating conversion LUTs on the basis of information on the curvature of ink values. Descriptions of commonalities with the first embodiment are simplified or omitted.

Method for Creating Nonlinear Conversion LUT Using Curvature Information

A method for creating conversion LUTs according to this embodiment will be described hereinbelow. In this embodiment, conversion LUTs with 17 grid points are created on the basis of color separation LUTs with 33×33×33 grid points. Two points at both ends of each conversion LUT individually store fixed values 0 and 255.

Figure 9:
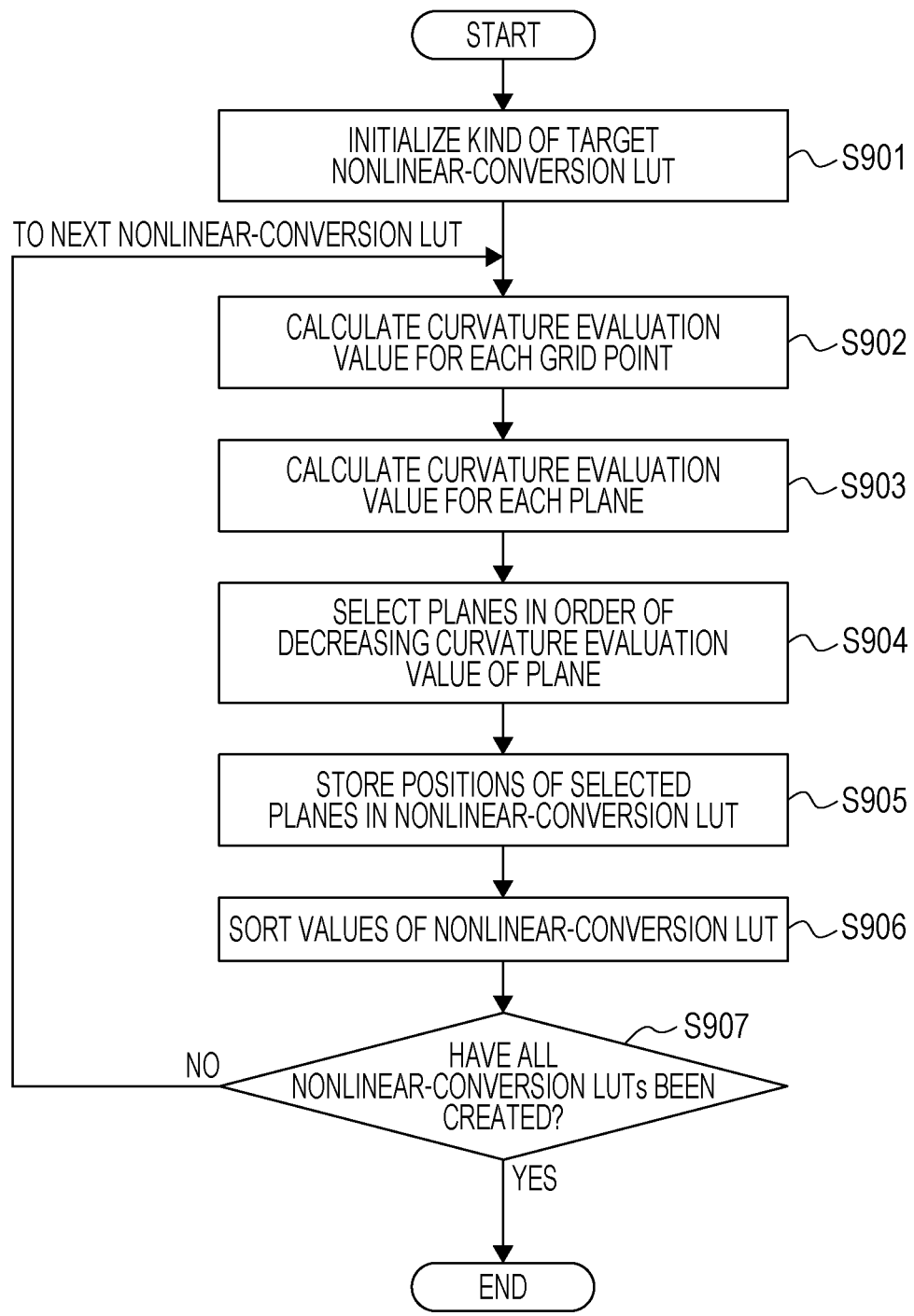
FIG. 9 is a flowchart for creating conversion LUTs according to a second embodiment.

FIG. 9 is a flowchart for creating conversion LUTs according to this embodiment. First, the kind of a conversion LUT to be designed is initialized (S901). In this embodiment, the R-axis of a cyan ink (the uppermost graph for the LUT 1051 in FIG. 2A) is selected.

Next, a curvature evaluation value is calculated as curvature information for each of the grid points of the color separation LUT (S902). The curvature evaluation value is calculated for each axis with reference to the adjacent grid points of a target grid point as positions satisfying a predetermined condition. Specifically, the target grid point position is set to P, and a cyan ink value at the grid point P is set to C(P). Two grid points next to the grid point P in the R-axis direction are set to P+ and P−, and their respective cyan ink values are set to C(P+) and C(P−). The curvature of the cyan ink in the R-axis direction at the grid point P is obtained by the following expression:

$$C(P+)+C(P-)-2\times C(P)$$

The curvatures in the G-axis direction and the B-axis direction are also calculated in the same way, and the average values in the individual axis directions are taken as curvature evaluation values at the grid point P. In this embodiment, curvature evaluation values for 31×31×31 grid points, which are obtained by subtracting grid points on the uppermost plane from the color separation LUT with 33×33×33 grid points.

Figure 10:
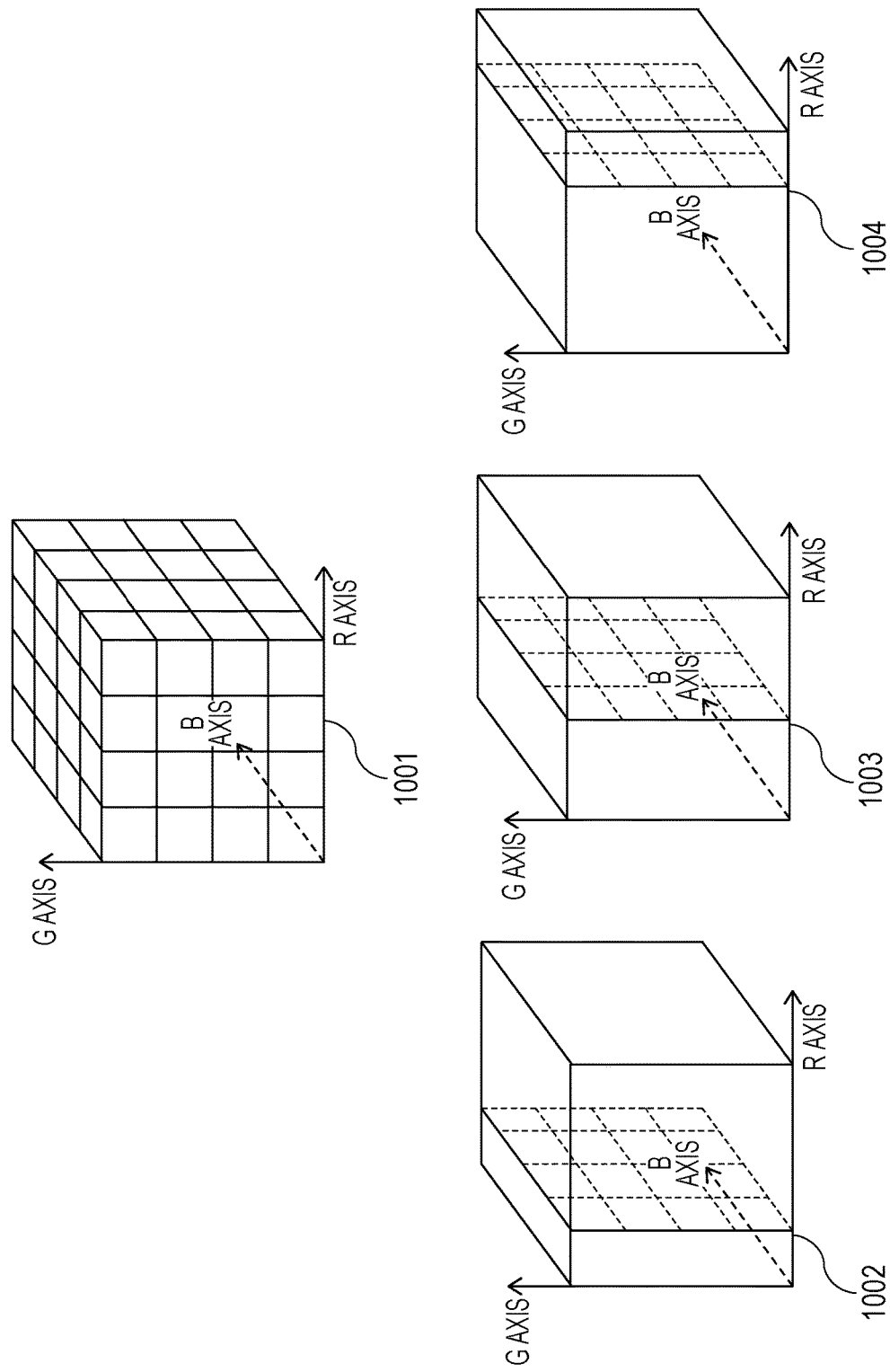
FIG. 10 is a schematic diagram illustrating a method for calculating a curvature evaluation value for each plane.

Next, a curvature evaluation value for each plane is calculated (S903). FIG. 10 is a schematic diagram illustrating a method for calculating a curvature evaluation value for each plane. A LUT 1001 is a three-dimensional color separation LUT, in which 5×5×5 grids are illustrated for the sake of simplicity. The curvature evaluation values at all the grid point positions have been calculated at S902. In creating the conversion LUT along the R-axis, the curvature evaluation values are calculated for each of the planes (an LUT 1002 to an LUT 1004) having the same R value. For the curvature evaluation value of each plane, the average value of the curvature evaluation values of the grid points in the plane is used.

In this embodiment, the curvature evaluation values of 31 planes, which are calculated by excluding two planes at both ends from the color separation LUT with 33×33×33 grid points.

Next, a predetermined number of planes are selected in the order of decreasing curvature evaluation value of each plane, that is, according to the curvature (S904). In this embodiment, 15 planes are selected from 31 planes, where 15 is calculated by excluding two points at both ends from the number of the grid points, 17, of the conversion LUT.

Next, the positions of the selected planes are stored in the conversion LUT (S905). In this embodiment, since the conversion LUT with 17 grid points are used, R'1 to R'15 are stored. For values at both ends of the conversion LUT, 0 and 255 are stored. The values stored in the conversion LUT are sorted so as to monotonously increase with respect to the R-axis (S906).

Next, it is determined whether all conversion LUTs have been created (S907). If not, the process is returned to S902 to create the next conversion LUT. In this embodiment, after conversion LUTs for the cyan ink are created along the R-axis, G-axis, and B-axis directions, the process is moved for a magenta ink, a yellow ink, and so on. The creation may be performed in any sequence; parallel calculation may be made.

If all conversion LUTs have been created, the process ends.

Modifications 2

The second embodiment uses an average value as a curvature evaluation value for each plane at S903, although any statistic value may be used. For example, a combination of a maximum value, a median value, and variances may be used.

Advantageous Effects 2

This embodiment reduces a decrease in accuracy due to interpolation operation by creating conversion LUTs using a simple method.

Third Embodiment

The first and second embodiments show examples in which the nonlinear conversion unit 104 is disposed immediately ahead of the color-separation processing unit 106. Another processing unit may be disposed between the nonlinear conversion unit 104 and the color-separation processing unit 106. A third embodiment shows an example in which the color-matching processing unit 102 is disposed between the nonlinear conversion unit 104 and the color-separation processing unit 106. Descriptions of commonalities with the first and second embodiments are simplified or omitted.

Figure 11:
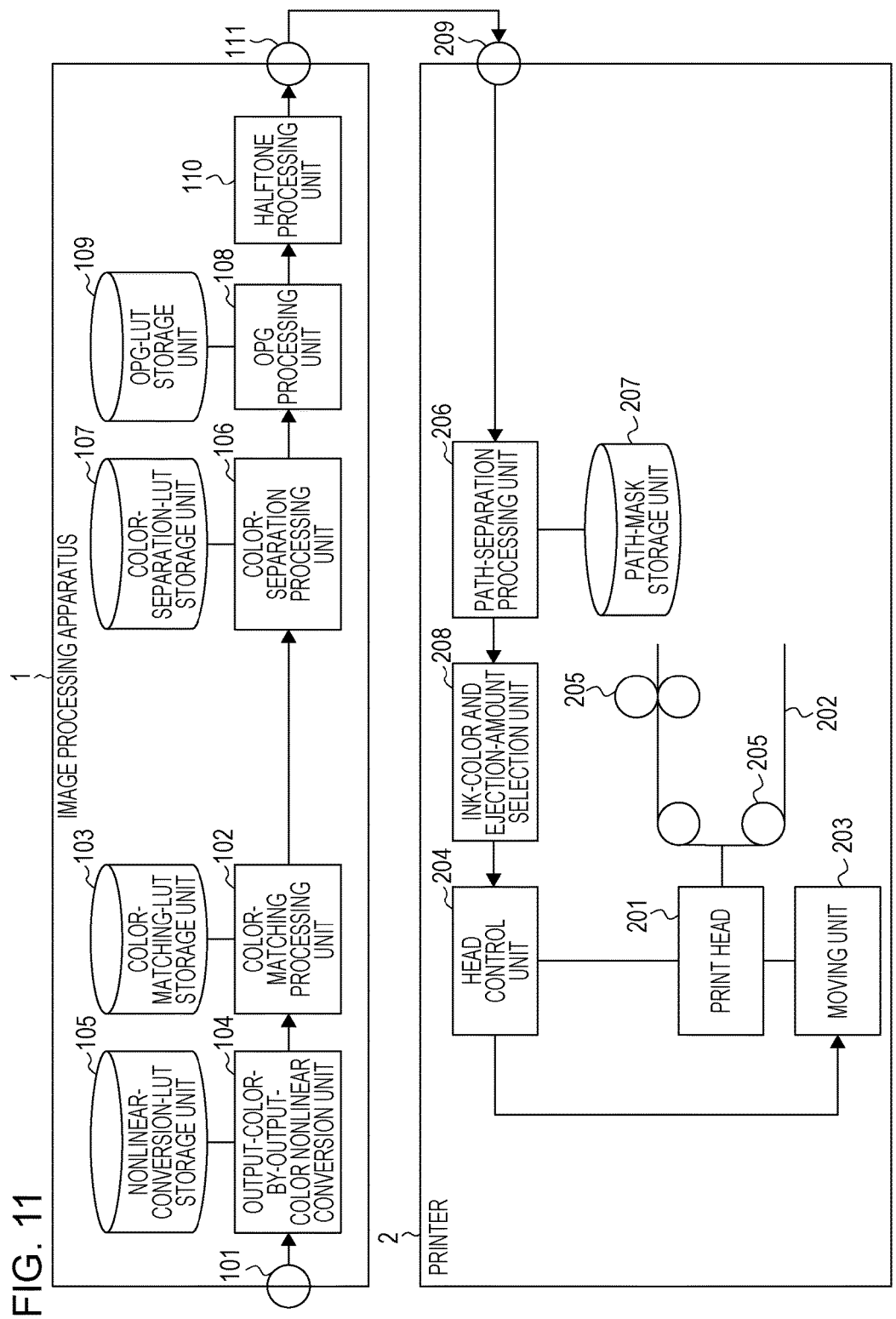
FIG. 11 is a block diagram illustrating the configuration of an image forming apparatus according to a third embodiment.

FIG. 11 is a block diagram illustrating the configuration of an image forming apparatus according to this embodiment. Difference from the configuration of the first embodiment (FIG. 1) is that the conversion unit 104 is disposed ahead of the color-matching processing unit 102.

Figure 5:
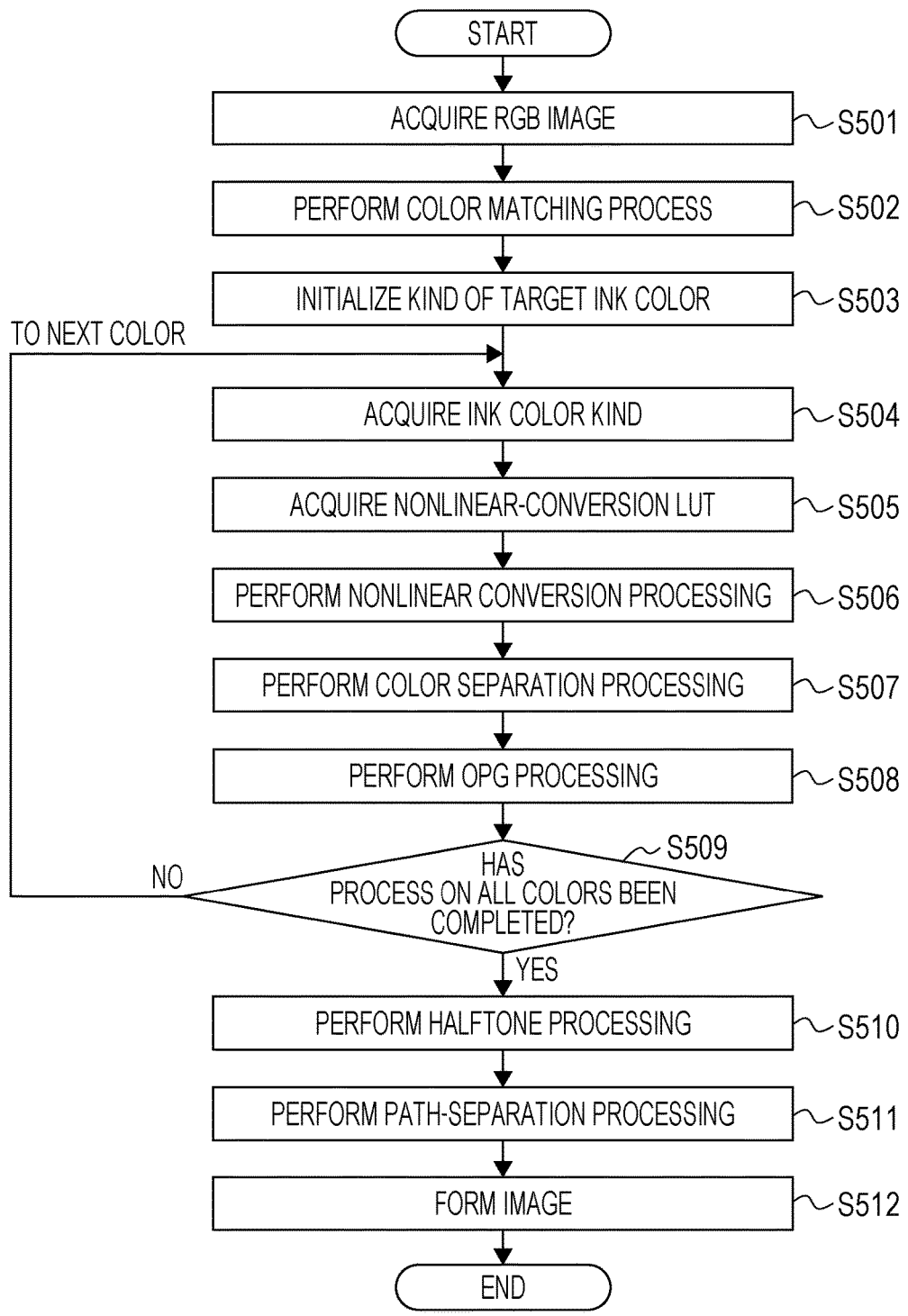
FIG. 5 is a flowchart for image processing.

This change causes the color matching process (S502) to move to between the nonlinear conversion processing (S506) and the color separation processing (S507) in the flowchart of FIG. 5.

Conversion LUTs and color separation LUTs are created according to the flowcharts in FIGS. 6 and 7, as in the first embodiment.

This embodiment also reduces a decrease in accuracy due to interpolation operation even if some processing is performed between output-color-by-output-color nonlinear conversion processing and color separation processing, as described above.

Fourth Embodiment

The first to third embodiments show examples in which one nonlinear conversion unit 104 for each output color is provided. A fourth embodiment shows an example in which a plurality of nonlinear conversion units for individual output colors are provided. Descriptions of commonalities with the first to third embodiments are simplified or omitted.

Figure 12:
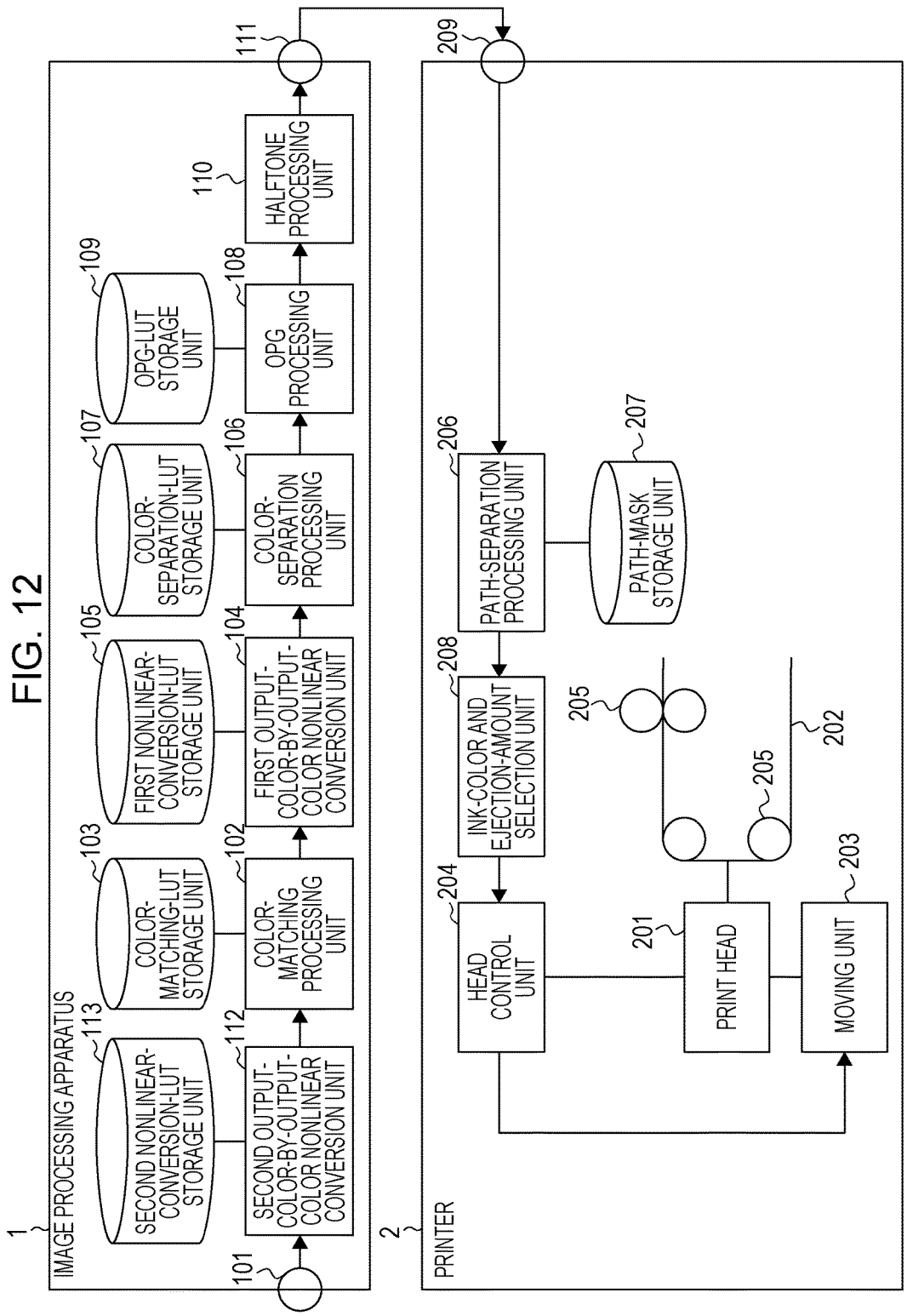
FIG. 12 is a block diagram illustrating the configuration of an image forming apparatus according to a fourth embodiment.

FIG. 12 is a block diagram illustrating the configuration of an image forming apparatus according to the fourth embodiment. Difference from the configuration of the third embodiment (FIG. 11) is that a plurality of nonlinear conversion units for individual output colors are provided.

A first output-color-by-output-color nonlinear conversion unit 104 is provided to improve the interpolation accuracy of the color-separation processing unit 106. A first nonlinear-conversion-LUT storage unit 105 stores first conversion LUTs for individual CMYK colors, which are output from the color-separation processing unit 106. A second output-color-by-output-color nonlinear conversion unit 112 is provided to improve the interpolation accuracy of the color-matching processing unit 102. A second nonlinear-conversion-LUT storage unit 113 stores second conversion LUTs for RGB colors, which are output from the color-matching processing unit 102.

This change allows nonlinear conversion processing for each output color in the flowchart for image forming processing shown in FIG. 5 to be performed also in color matching processing.

To create the second conversion LUTs, color matching LUTs with 33×33×33 grid points designed in advance are used. In the flowcharts shown in FIGS. 6 and 7, the output colors are changed from CMYK to RGB for the color matching LUTs instead of the color separation LUTs.

Thus, this embodiment reduces a decrease in accuracy due to interpolation operation by using a plurality of nonlinear conversion units for individual output colors.

Fifth Embodiment

The fourth embodiment shows an example in which nonlinear conversion is performed for individual output colors (CMYK) of the color separation LUTs and for individual output colors (RGB) of the color correction LUTs. A fifth embodiment shows an example in which nonlinear conversion is performed for each combination of the output colors. Descriptions of commonalities with the fourth embodiment are simplified or omitted.

The fifth embodiment differs from the fourth embodiment in processing performed by the first conversion unit 104. The fourth embodiment has a configuration in which conversion LUTs are provided for the individual CMYK colors output from the color-separation processing unit 106. The fifth embodiment includes conversion LUTs for individual combinations of RGB colors output from the color-matching processing unit 102 and CMYK colors output from the color-separation processing unit 106.

This change causes the 3×4 kinds of conversion LUT shown in FIGS. 2A to 2D to increase to 3×3×4 kinds.

As described above, the fifth embodiment reduces a decrease in accuracy due to interpolation operation by performing nonlinear conversion for each of combinations of a plurality of output colors.

Sixth Embodiment

The fourth and fifth embodiments show an example in which nonlinear conversion is performed for each of output colors (CMYK) of the color separation LUTs and for each of output colors (RGB) of the color correction LUTs and an example in which nonlinear conversion is performed for each of combinations of the output colors.

A sixth embodiment shows an example in which one of a plurality of nonlinear conversion processes according to the input and output characteristics of color separation LUTs is selected for use. Descriptions of commonalities with the above embodiments are simplified or omitted.

Apparatus Configuration 2

FIG. 15 is a block diagram illustrating the configuration of an image forming apparatus according to the sixth embodiment. Differences from FIG. 1 are a nonlinear conversion unit 1104 and a nonlinear-conversion-process selection unit 1105 (hereinafter also referred to as "selection unit 1105") and a nonlinear-conversion processing unit 1106 (hereinafter also referred to as "conversion unit 1106"), which are included in the nonlinear conversion unit 1104.

The nonlinear conversion unit 1104 performs nonlinear conversion on image data subjected to color matching processing. The selection unit 1105 selects one nonlinear conversion process from a plurality of nonlinear conversion processes according to the input and output characteristics of the color separation LUT. The conversion unit 1106 performs nonlinear conversion processing using a nonlinear conversion process selected by the selection unit 1105.

In the sixth embodiment, the print head 201 is equipped with inks of five colors: cyan (C), magenta (M), yellow (Y), black (K), and gray (GY). The sixth embodiment performs 15 nonlinear conversion processes in total: combinations of three kinds of RGB image data subjected to color matching processing and five kinds of ink color.

FIG. 16 is a block diagram illustrating the details of the configuration of the nonlinear conversion unit 1104. The conversion unit 1106 includes three processing units: a conversion unit 1 (1106_1), a conversion unit 2 (1106_2), and a conversion unit 3 (1106_3).

Input signals IN0(R), IN1(G), and IN2(B) indicating image data subjected to color matching processing are respectively input to input-signal changeover switches 1108 to 1110. The input-signal changeover switches 1108 to 1110 switch the destination of the input signals IN0(R), IN1(G), and IN2(B) to one of the conversion unit 1, the conversion unit 2, and the conversion unit 3 on the basis of selection information for nonlinear conversion processing selected by the selection unit 1105. The selection information for nonlinear conversion processing is information indicating which of the conversion unit 1, the conversion unit 2, and the conversion unit 3 is to be selected for a combination of the kind (R, G, or B) of input signal and the kind (C, M, Y, K, or GY) of ink color. A method for determining the selection information for nonlinear conversion processing will be described later.

The storage unit 105 stores three LUTs: a LUT 105_1 for the conversion unit 1, a LUT 105_2 for the conversion unit 2, and a LUT 105_3 for the conversion unit 3.

The conversion unit 1106_1 performs nonlinear conversion processing using the LUT 105_1 for the conversion unit 1. Likewise, the conversion unit 1106_2 performs nonlinear conversion processing using the LUT 105_2 for the conversion unit 2, and the conversion unit 1106_3 performs nonlinear conversion processing using the LUT 105_3 for the conversion unit 3.

Output-signal changeover switches 1111, 1112, and 1113 respectively receive output signals from the conversion unit 1, the conversion unit 2, and the conversion unit 3 and assign output signals to one of R', G', and B', which are inputs to the color-separation processing unit 106, on the basis of the selection signals from an output-signal selection unit 1114. If the output signals from the conversion unit 1, the conversion unit 2, and the conversion unit 3 have additional information on which of R, G, and B the conversion units 1 to 3 correspond, assignment of RGB may be performed on the basis of the information.

The color-separation processing unit 106 generates five planes of 8-bit ink value images corresponding to inks of five colors of the printer 2 using the output signals R', G', and B' from the nonlinear conversion unit 1104. When performing color separation processing, the color-separation processing unit 106 refers to the three-dimensional color separation LUT stored in the color-separation-LUT storage unit 107. Each color separation LUT describes the ink values of one of five colors only on grid points thinned out to 17×17×17 points. Values between the grid points are calculated by linear interpolation. In this embodiment, color separation LUTs with 17×17×17 grid points are created for individual five colors in total on the basis of color separation LUTs with 33×33×33 grid points designed in advance.

Image Forming Process 2

Figure 17:
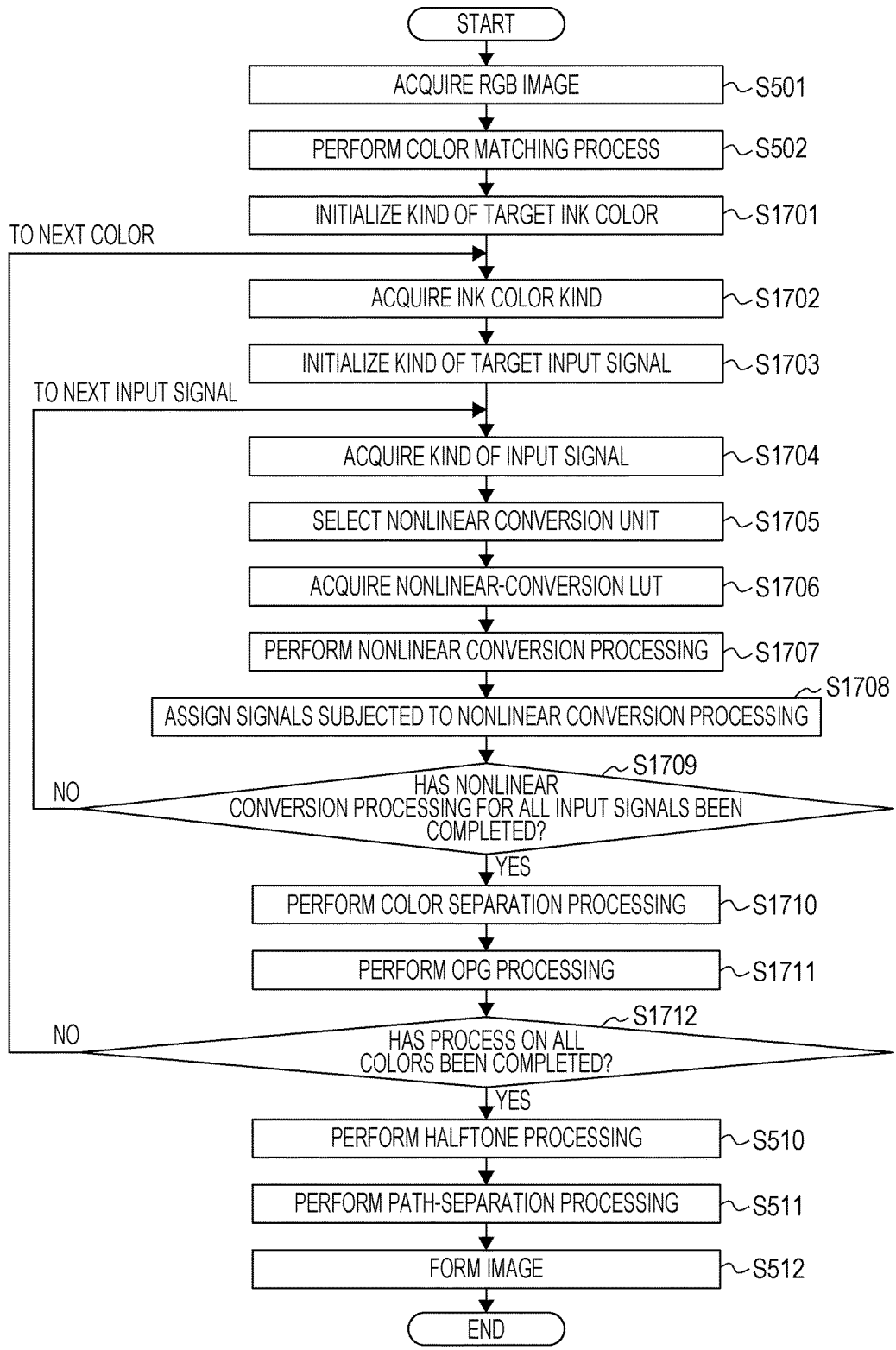
FIG. 17 is a flowchart for image processing according to the sixth embodiment.

Next, an image forming process according to the sixth embodiment will be described with reference to a flowchart in FIG. 17. Steps S501 and S502 and steps S510 to S512 are common to those in FIG. 5, and descriptions thereof will be omitted. Steps S1701 to S1712 different from FIG. 5 will be described.

The nonlinear conversion unit 1104 performs the following process. First, the nonlinear conversion unit 1104 initializes the kind of output ink color to be converted (S1701). The kind of the initial output ink color is cyan. Next, the nonlinear conversion unit 1104 acquires the kind of the set output ink color (S1702). Next, the nonlinear conversion unit 1104 initializes the kind of an input signal to be processed (S1703). The kind of the initial input signal is R. Next, the nonlinear conversion unit 1104 acquires the kind of the set input signal (S1704).

Next, the nonlinear-conversion-process selection unit 1105 performs the following process. The nonlinear-conversion-process selection unit 1105 acquires information on the group number g (g is one of 1, 2, and 3) of a conversion unit associated by the kind of the output ink color acquired at S1702 and the kind of the input signal acquired at S1704 to select a conversion LUT and a conversion unit to be used in the subsequent steps (S1705). If the group number is 1, the LUT 105-1 for the conversion unit 1 and the conversion unit 1 (1106_1) are selected. If the group number is 2, the LUT 105-2 for the conversion unit 2 and the conversion unit 2 (1106_2) are selected. If the group number is 3, the LUT 105-3 for the conversion unit 3 and the conversion unit 3 (1106_3) are selected.

Next, the conversion unit 1106 performs the following process. The conversion unit 1106 acquires the conversion LUT selected at S1705 from the storage unit 105 (S1706) and performs nonlinear conversion processing using the acquired conversion LUT (S1707).

Next, the output-signal selection unit 1114 associates the signal subjected to nonlinear conversion processing at S1707 with one of R, G, and B and assigns the signal subjected to the nonlinear conversion processing to one of R', G', and B' signals, which are inputs to the color-separation processing unit 106, by respectively controlling the output-signal changeover switches 1111, 1112, and 1113 (S1708).

Next, it is determined whether the nonlinear conversion processing has been completed for all kinds of input signals (S1709). If Yes, the process goes to S1710. If not, the process returns to S1704 for the next input signal. The sequence of the kinds of the input signals is R, G, and B.

Next, the color-separation processing unit 106 generates an ink value image from the image data corrected by the nonlinear conversion unit 1104 (S1709). When performing the color separation processing, the color-separation processing unit 106 refers to the three-dimensional color separation LUT stored in the color-separation-LUT storage unit 107. Here, an ink value image corresponding to cyan is generated.

Next, the OPG processing unit 108 performs gamma correction processing on the ink value image generated by the color-separation processing unit 106 (S1711). Here, a one-dimensional OPG LUT for a cyan ink value image is used. The values of the cyan OPG LUT are set in advance so that, when only a cyan ink is used for printing, the lightness of the print changes linearly with the values of the ink value image.

Next, it is determined whether all the processes to the OPG processing have been completed for all kinds of ink (S1712). If yes, the process goes to S510. If not, the process returns to S1702 for the next ink color. The ink kinds to be processed is in the order of cyan, magenta, yellow, black, and gray.

This is a description of the image forming process different from that of FIG. 5.

Method for Creating Nonlinear Conversion LUTs and Color Separation LUTs

The following are a method for grouping input signals according the input and output characteristics of the color separation LUT and a method for creating conversion LUTs and color separation LUTs based on the result of grouping. In this embodiment, as in the first embodiment, a conversion LUT with 17 grid points and a color separation LUT with 17×17×17 grid points are created on the basis of a color separation LUT with 33×x33 grid points designed in advance.

First, a method for grouping input signals according to the input and output characteristics of the color separation LUT will be described.

FIGS. 18A to 18E are graphs of the respective curvatures of ink colors C, M, Y, BK, and GY (on the horizontal axes of the graphs) plotted against input signals of RGB (on the vertical axes of the graphs) of a color separation LUT with 33×33×33 grid points designed in advance, illustrating 15 graphs in total obtained by multiplying the number of the kinds of input signals RGB, 3, by the number of ink colors, 5. Each curvature is the average of doubly differential values of the ink values plotted on the horizontal axis calculated for all combinations of values on the other two axes.

FIG. 19 is a table in which signals input to the conversion unit 1106 are sorted into three groups according the input and output characteristics. In the 15 graphs of FIGS. 18A to 18E, input signals whose curvatures from a dark portion to a halftone portion are relatively large is listed as group number 1, input signals whose curvatures from an halftone portion to a light portion are relatively large is sorted as group number 2, and input signals whose overall curvatures change a little are sorted as group number 3.

This is an example in which the number of groups is three, each including five input signals. In some embodiments, the number of groups and the number of kinds of input signals that belong to the groups are set according to the input and output characteristics of the color separation LUT. For example, input signals whose curvatures are relatively large at a plurality of levels of gray, for example, at a dark portion and a light portion, or input signals whose curvatures increase or decrease monotonously can be used as input and output characteristics for grouping. The number of groups can be one or more and equal to or less than the total number of input signals (in this example, 15).

In this case, the number of conversion units included in the conversion unit 1106 is set according to the number of groups. If the number of groups is five, the conversion unit 1106 includes five processing units: a conversion unit 1 (1106_1), a conversion unit 2 (1106_2), a conversion unit 3 (1106_3), a conversion unit 4 (1106_4), and a conversion unit 5 (1106_5).

Next, a method for creating conversion LUTs and color separation LUTs on the basis of the result of grouping will be described.

FIG. 20 is a flowchart for creating conversion LUTs and color separation LUTs according to the sixth embodiment. Steps S601 and S603 and steps S605 to S610 are common to those in FIG. 6, and descriptions thereof will be omitted. Steps S2001 to S2003 different from FIG. 6 will be described.

At S2001, conversion LUTs corresponding to the number of groups are individually initialized. Specifically, the LUT 105_1 for the conversion unit 1 corresponding to group number 1, the LUT 105_2 for the conversion unit 2 corresponding to group number 2, and the LUT 105_3 for the conversion unit 3 corresponding to group number 3 are individually initialized.

At S2002, a conversion LUT corresponding to a signal input to the conversion unit 1106 is selected. Assuming that a signal input to the conversion unit 1106 is expressed as "the kind of the input signal_ink color", as FIG. 19 shows, the LUT 105_1 for the conversion unit 1 is selected for input signals R_C, G_M, G_Y, B_Y, and B_BK that belong to group 1. For input signals R_BK, R_GY, G_BK, G_GY, and B_GY that belong to group 2, the LUT 105_2 for the conversion unit 2 is selected. For input signals R_M, R_Y, G_C, B_C, and B_M that belong to group 3, the LUT 105_3 for the conversion unit 3 is selected.

Next, at S2003, the selected conversion LUT is subjected to optimization processing.

Performing the above process on each of inks of five colors, C, M, Y, K, and GY, allows conversion LUTs and color separation LUTs to be created.

Figure 21A:
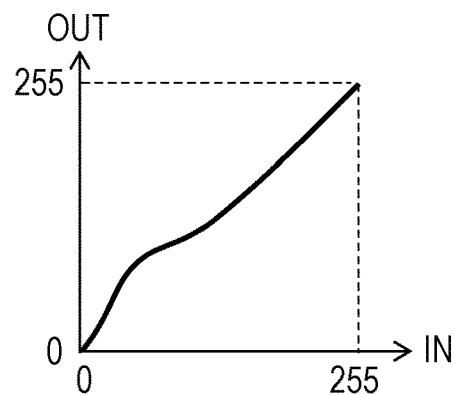
FIG. 21A is a graph showing an example of a conversion LUT according to the sixth embodiment.
Figure 21B:
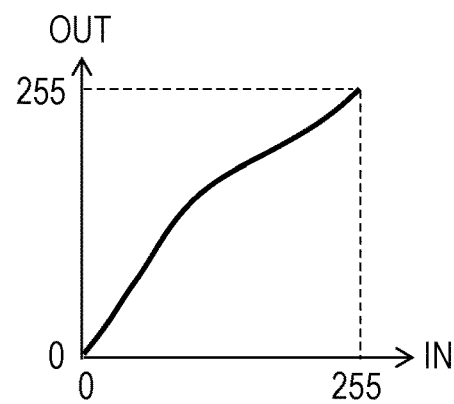
FIG. 21B is a graph showing an example of a conversion LUT according to the sixth embodiment.
Figure 21C:
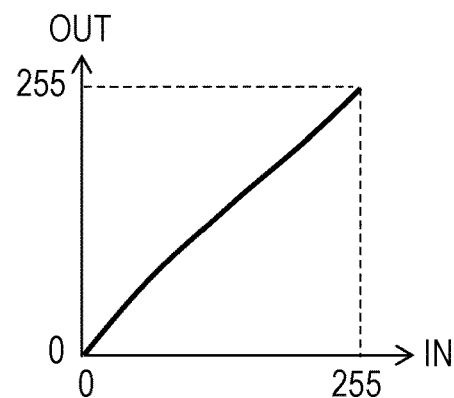
FIG. 21C is a graph showing an example of a conversion LUT according to the sixth embodiment.

FIGS. 21A to 21C are graphs showing examples of conversion LUTs according to the sixth embodiment. FIG. 21A shows the LUT 105_1 for the conversion unit 1, FIG. 21B shows the LUT 105_2 for the conversion unit 2, and FIG. 21C shows the LUT 105_3 for the conversion unit 3. Using the LUTs 105_1, 105_2, and 105_3 in FIGS. 21A, 21B, and 21C allows the values of input IN to be converted to the values of output OUT. Using the LUT 105_1 shown in FIG. 21A enables the values of the input signals included in group number 1 to be converted to the values of the input signals from a dark portion to a halftone portion. Using the LUT 105_2 shown in FIG. 21B enables the values of the input signals included in group number 2 to be converted to the values of the input signals from a halftone portion to a light portion. Using the LUT 105_3 shown in FIG. 21C enables the values of the input signals included in group number 3 to be substantially linearized.

The LUT 105_1 shown in FIG. 21A has the function of unequalizing the grid point positions from a dark portion through a halftone portion of the color separation LUT. The LUT 105_2 shown in FIG. 21B has the function of unequalizing the grid point positions from a halftone portion to a light portion of the color separation LUT. The LUT 105_3 shown in FIG. 21C has the function of slightly unequalizing the grid point positions at all levels of gray of the color separation LUT. The use of the nonlinear LUTs enables the grid point positions of the color separation LUT to be unequalized, thus enhancing the interpolation accuracy by suitably arranging the grid points.

As described above, the sixth embodiment reduces a decrease in accuracy due to interpolation operation by using a nonlinear conversion LUT selected from a plurality of nonlinear conversion LUTs according to the input and output characteristics of the color separation LUT.

Furthermore, providing conversion LUTs according to the input and output characteristics of the color separation LUT for use reduces the capacity of a memory for storing the LUTs and the circuit load. This is advantageous particularly to printers that output a large number of colors. Furthermore, additional output colors can be used without adding LUTs.

Seventh Embodiment

The sixth embodiment is an example in which one nonlinear conversion LUT is selected for use from a plurality of nonlinear conversion LUTs according to the input and output characteristics of the color separation LUT.

A seventh embodiment shows an example in which a plurality of combinations of input signals that belong to different groups are created when a plurality of nonlinear conversions according to the input and output characteristics of a color separation LUT are determined, and optimization of a conversion LUT and a color separation LUT is performed on each of the combinations. Descriptions of commonalities with the above embodiments are simplified or omitted.

FIG. 22 is a table showing an example of a plurality of grouping candidates and input signals corresponding to the candidates.

Grouping candidate No. 1 shows a combination of input signals grouped according to the input and output characteristics of the color separation LUT, as described in the sixth embodiment. However, it is sometimes unclear which of group number 1 and group number 3 a signal whose curvature has no distinguishing characteristics, such as R_Y in FIG. 18C, belongs to. In such a case, grouping candidate No. 2 in which only R_Y is grouped to a different group from the group in grouping candidate No. 1.

As an alternative, grouping candidate numbers may be assigned to combinations of groups of a plurality of input signals. There are a maximum of 455 kinds of combination in which 15 kinds of input signal are sorted into three groups. A candidate combination can be set in consideration of the input and output characteristics of the color separation LUT and the computational load of optimization processing, described later. Examples of the combination are shown in grouping candidate No. 3 and No. 4 in FIG. 22. Grouping candidate No. 3 is an example in which input signals related to R component is sorted to group number 1, input signals related to G component are sorted to group number 2, and input signals related to B component are sorted to group number 3. Grouping candidate No. 4 is an example in which input signals related to R component and G_C and G_M are sorted to group number 1, input signals related to G_Y and G_BK of G components are sorted to group number 2, and input signals related to G_GY of G components and B components are sorted to group number 3.

In each of the plurality of grouping candidate numbers provided in the above, a grouping candidate in which the best evaluation value is obtained is selected following the process of creating conversion LUTs and color separation LUTs in the sixth embodiment in FIG. 20. The optimized conversion LUT and color separation LUT are used for the selected grouping candidate to perform color conversion.

Thus, this embodiment creates a plurality of combinations in which a plurality of input signals are sorted to different groups and performs optimization processing on the conversion LUT and the color separation LUT for each combination, described later. This allows a group in which errors due to interpolation operation are reduced to be selected, thus reducing errors due to interpolation operation.

Eighth Embodiment

The sixth and seventh embodiments show examples of nonlinear conversion using conversion LUTs for obtaining output signals from input signals.

An eighth embodiment shows an example in which the values of input signals are preprocessed according to the kinds of the input signals, and the preprocessed signal values are used as inputs to the conversion LUT to perform nonlinear conversion. Descriptions of commonalities with the above embodiments are simplified or omitted.

FIGS. 23A to 23E are graphs illustrating preprocessing in the eighth embodiment.

Figure 23A:
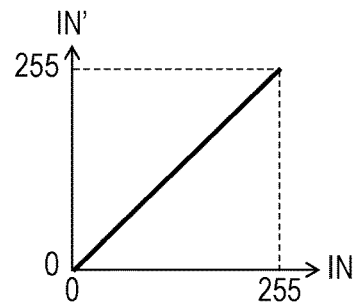
FIG. 23A is a graph showing an example in which an input signal is not pre-processed.
Figure 23B:
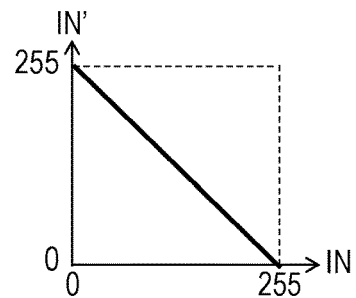
FIG. 23B is a graph illustrating preprocessing according to an eighth embodiment.
Figure 23C:
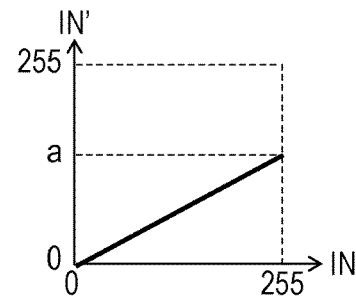
FIG. 23C is a graph illustrating preprocessing according to the eighth embodiment.
Figure 23D:
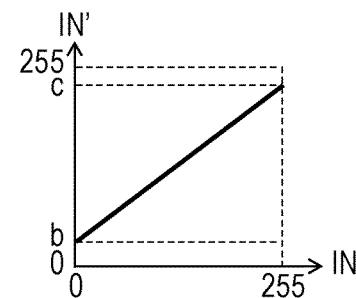
FIG. 23D is a graph illustrating preprocessing according to the eighth embodiment.
Figure 23E:
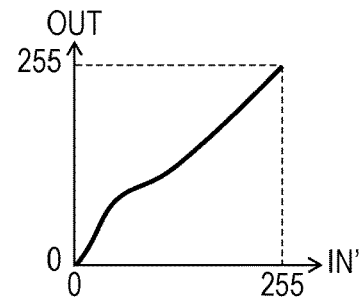
FIG. 23E is a graph showing an optimized conversion LUT.

FIG. 23A shows an example in which an input signal IN is not preprocessed; FIG. 23B shows an example in which the input signal IN is reversed; FIG. 23C shows an example in which the scale of the input signal IN is changed; and FIG. 23D shows an example in which the input signal IN is shifted. Performing one of preprocess A to D on the input signal IN to obtain a signal IN'. This signal IN' is input to the conversion LUT in FIG. 23E, and OUT is acquired as an output value. The conversion LUT in FIG. 23E is an optimized LUT when the input signal IN is given in advance to FIGS. 23A and 23B, FIGS. 23A and 23C, or FIGS. 23A and 23D. FIG. 23E shows a representative of LUTs subjected to the above three kinds of processing for ease of illustration.

When there are an input signal A whose curvature changes relatively significantly at the levels of gray from a dark portion to a halftone portion and an input signal B whose curvature changes relatively significantly at the levels of gray from a light portion to a halftone portion, the portions in which changes in curvature relative to the input signals A and B are great are substantially aligned by reversing one of the input signals A and B using the preprocessing in FIG. 23B. This allows the input signal A and the input signal B to be sorted to a group that uses the same conversion LUT.

When there are an input signal A whose curvature changes relatively significantly at the levels of gray from a dark portion to a halftone portion and an input signal C whose curvature changes relatively significantly at the level of gray at a halftone portion, the portions in which changes in curvature relative to the input signals A and C are great are substantially aligned by changing the scale of the value of the input signal C using the preprocessing in FIG. 23C. This allows the input signal A and the input signal C to be sorted to a group that uses the same conversion LUT.

When there are an input signal A whose curvature changes relatively significantly at the levels of gray from a dark portion to a halftone portion and an input signal D whose change in curvature at the levels of gray from a dark portion to a halftone portion occurs in a wider tone range than that of the input signal A, the portions in which changes in curvature relative to the input signals A and D are great are substantially aligned by shifting the value of the input signal D using the preprocessing in FIG. 23D. This allows the input signal A and the input signal D to be sorted to a group that uses the same conversion LUT.

The preprocessing of the values of input signals according to the input and output characteristics of the color separation LUTs that the individual input signals belong to allows the plurality of input signals to be grouped, and the above-described optimization processing allows a common conversion LUT to be designed for use.

Any preprocessing may be performed for converting input signals to enable the same conversion LUT to be used; preprocessing is not limited to those shown in FIGS. 23B, 23C, and 23D. As an alternative, preprocessing in which the characteristics of the pre-processing shown in FIGS. 23B, 23C, and 23D are combined may be employed. As a further alternative, expression conversion or interpolation operation may be employed.

This embodiment preprocesses the values of input signals according to the kinds of the input signals and performs nonlinear conversion using the preprocessed signal values as inputs to the conversion LUT. This allows a group in which a decrease in accuracy due to interpolation operation is reduced to be selected, thereby reducing errors due to interpolation operation. Furthermore, this embodiments allows conversion LUTs to be grouped according to the input and output characteristics of individual color separation LUTs, reducing the capacity of a memory for storing the LUTs and the circuit load more effectively. This is particularly effective in printers that eject a large number of colors because many inks have high similarity in the input and output characteristics of the color separation LUTs. Furthermore, additional output colors can be used without adding LUTs.

Ninth Embodiment

The above embodiments show examples in which a printer is used as an image forming apparatus. A ninth embodiment shows an example in which a display is used. Descriptions of commonalities with the above embodiments are simplified or omitted.

Figure 24:
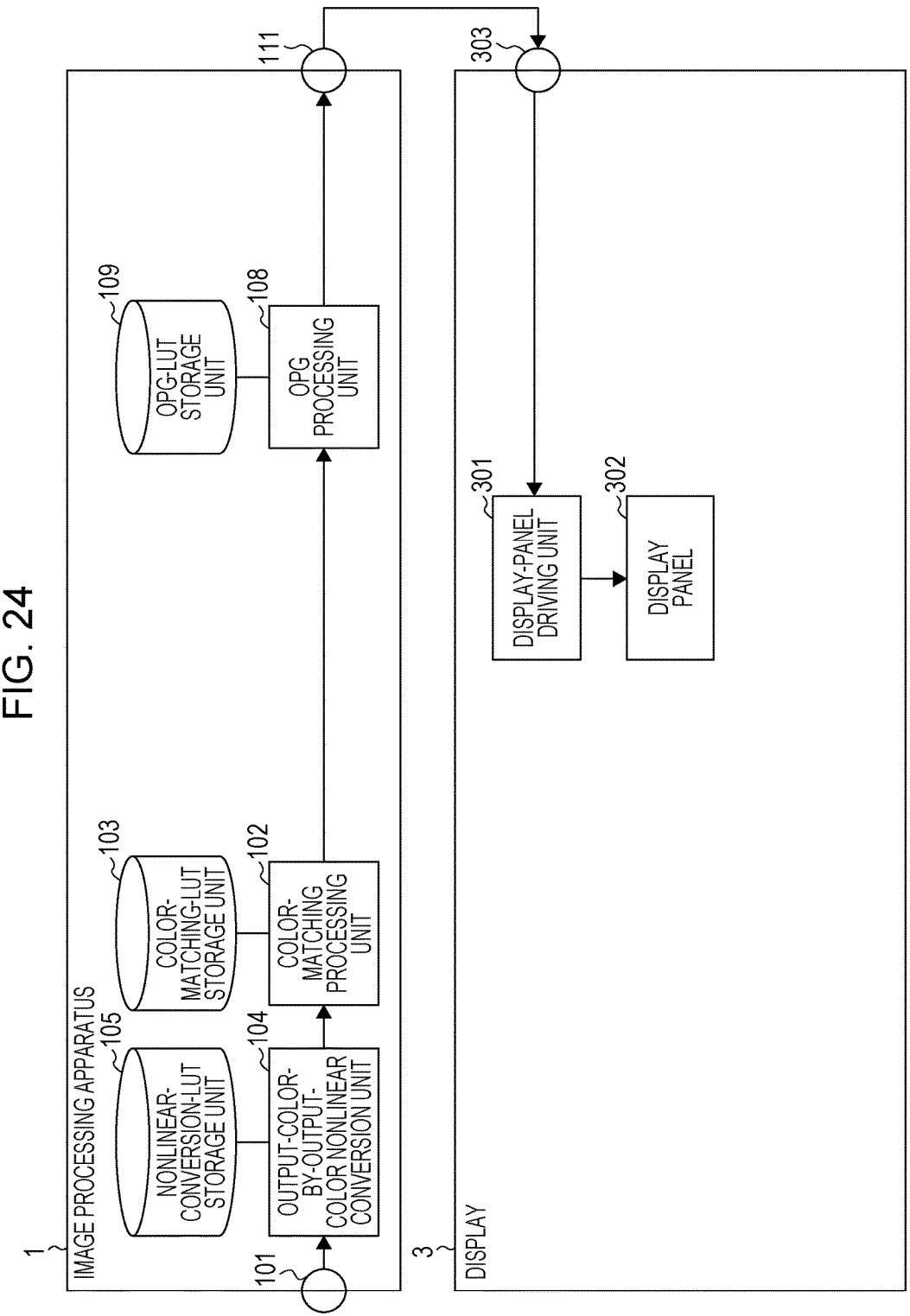
FIG. 24 is a block diagram illustrating the configuration of an image forming apparatus according to a ninth embodiment.

FIG. 24 is a block diagram illustrating the configuration of an image forming apparatus according to the ninth embodiment. In FIG. 24, the image forming apparatus includes an image processing apparatus 1 and a display 3.

The display 3 includes a display-panel driving unit 301 and a display panel 302. The display-panel driving unit 301 drives the display panel 302 in response to RGB signals acquired via an input terminal 303. The display panel 302 displays a gray-scale image by adjusting light transmittance determined by the property of the liquid-crystal substance.

Figure 25:
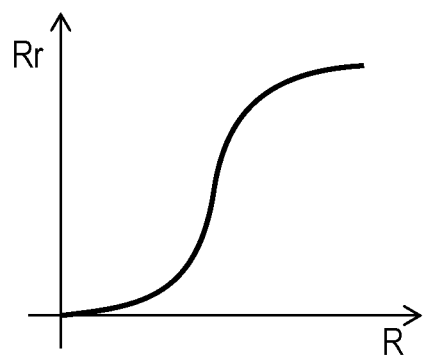
FIG. 25 is a graph showing one of color matching LUTs according to the ninth embodiment.

FIG. 25 is a graph showing one of three-dimensional color matching LUTs stored in the color-matching-LUT storage unit 103. The graph shows nonlinear conversion for performing color correction according to the tone characteristics of the display 3. The output-color-by-output-color nonlinear conversion unit 104 performs nonlinear correction for each output color, as in the above embodiments. This unequalizes the grid point positions of the color matching LUT, improving the interpolation accuracy because of the appropriate grid point placement. In particular, when, in addition to the three primary colors RGB, a spot color, such as yellow (Y), is added to subpixels to increase the color gamut (the color reproduction range) of the display 3 or when white (W) is added to subpixels to increase the highest brightness or save power consumption, the nonlinear conversion for each output color according to some embodiments of the present disclosure is effective because the gray-level characteristics of Y and W signals significantly differ from the gray-level characteristics of RGB signals.

Thus, this embodiment reduces a decrease in accuracy due to interpolation calculation also in color correction processing for image display on the display.

Other Embodiments

The above embodiments show examples in which the printer 2 is an ink-jet printer. In some embodiment, the printer 2 is of another printing system. For example, the printer 2 may be an electrophotographic printer, a sublimation printer, a UV printer using coloring materials that are hardened under ultraviolet rays, and a 3D printer that forms a three-dimensional object. The present disclosure can also be applied to image display units, such as a display and a projector. Furthermore, the present disclosure can also be applied to photo-editing software and image processing software, such as computer graphic (CG) software.

The embodiments of the present disclosure prevents a decrease in accuracy due to interpolation calculation even if the nonlinearity of values output from a multi-dimensional LUT differs according to the kinds of values output from the multi-dimensional LUT.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-150507, filed Jul. 30, 2015, which is hereby incorporated by reference herein in its entirety.

The invention claimed is:

1. An image processing apparatus that converts input image signals of (n≥2) colors indicating an image and including a first color and a second color to output signals corresponding to color materials including a first color material and a second color material and that an output device deals with by interpolation processing using a look-up table, the apparatus comprising:
    one or more circuitry for causing the image processing apparatus to function as:
    a first conversion unit configured to convert the input image signals of the n colors to converted image signals of the n colors for each of the color materials by using a one-dimensional first look-up table, an input image signal corresponding to the first color to be converted to at least a first signal that is a converted image signal corresponding to the first color material and a second signal that is a converted image signal corresponding to the second color material, and an input image signal corresponding to the second color to be converted to at least a third signal that is a converted image signal corresponding to the first color material and a fourth signal that is a converted image signal corresponding to the second color material; and
    a second conversion unit configured to convert the converted image signals of the n colors corresponding to the color materials converted by the first conversion unit to the output signals corresponding to the color materials by using a three-dimensional second look-up table and the interpolation processing,
    wherein colors indicated by the n colors are different from colors of the color materials, and
    wherein the second conversion unit outputs the output signal corresponding to the first color material in response to the first signal and the third signal and outputs the output signal corresponding to the second color material in response to the second signal and the fourth signal.

2. The image processing apparatus according to claim 1, the first look-up table is a look-up table corresponding to linearity between the color materials and the input image signals.

3. The image processing apparatus according to claim 2, wherein the first look-up table corresponding to linearity between the color materials and the input image signals comprises curvature information indicating curvature of each output signal.

4. The image processing apparatus according to claim 3, wherein the curvature information indicates a curvature or a position at which the curvature satisfies a predetermined condition.

5. The image processing apparatus according to claim 1, wherein conversion with the first conversion unit comprises nonlinear conversion.

6. The image processing apparatus according to claim 1, wherein the input image signals and the output signals comprise gloss information indicating gloss of the image.

7. The image processing apparatus according to claim 1, wherein a maximum degree of a curve that the image signals converted by the first conversion unit can represent is higher than a maximum degree of a curve that the output signals converted by the second conversion unit can represent.

8. The image processing apparatus according to claim 1, wherein the first look-up table for use with the first conversion unit has more grid points per one dimension than grid points per one dimension of the second look-up table for use with the second conversion unit.

9. The image processing apparatus according to claim 1, wherein the output signals comprise a first output signal corresponding to a color component with a relatively light channel and a second output signal corresponding to a color component with a relatively dark channel.

10. The image processing apparatus according to claim 1,
wherein a maximum degree of a curve that the image signals converted by the first conversion unit can represent is higher than a maximum degree of a curve that the output signals converted by the second conversion unit can represent,
wherein the output signals comprises a first output signal corresponding to a color material with a relatively light channel and a second output signal corresponding to a color material with a relatively dark channel, and
wherein a look-up table for use with the first conversion unit, the look-up table corresponding to the first output signal, has a larger inclination in a dark region and a smaller inclination in a light region than a look-up table corresponding to the second output signal.

11. The image processing apparatus according to claim 1, wherein the at least one first conversion unit comprises a plurality of first conversion units.

12. The image processing apparatus according to claim 1,
wherein, for each of the colors of the image signals, the first conversion unit performs conversion into a plurality of image signals whose number corresponds to the number of the color materials dealt with by the output device; and
wherein the second conversion unit looks up image signals of a plurality of colors corresponding to a color component of interest obtained from the first conversion unit and determines output signals corresponding to the color component of interest.

13. The image processing apparatus according to claim 1, wherein the input image signals of the plurality of colors are image signals of red, green, and blue, and wherein the color materials dealt with by the output device include at least cyan, magenta, yellow, and black.

14. The image processing apparatus according to claim 13,
wherein the first conversion unit outputs a plurality of image signals whose number corresponds to multiplication of the number of the colors of the image signals by the number of the color components, and
wherein the second conversion unit outputs a plurality of output signals whose number corresponds to the number of the color components.

15. The image processing apparatus according to claim 1, wherein the first look-up table is created according to characteristics of the color materials in the second look-up table.

16. The image processing apparatus according to claim 1, wherein the second conversion unit determines the output signals corresponding to the color component of interest in the image based on image signals of the plurality of colors composed of values of different combinations.

17. The image processing apparatus according to claim 1, wherein the first conversion unit refers to at least a one-dimensional look-up table for converting the input image signal corresponding to the first color to the first signal, a one-dimensional look-up table for converting the input image signal corresponding to the first color to the second signal, a one-dimensional look-up table for converting the input image signal corresponding to the second color to the third signal, and a one-dimensional look-up table for converting the input image signal corresponding to the second color to the fourth signal, the one-dimensional look-up tables being different from each other.

18. A method for processing an image, the method converting input image signals of a n (n≥2) colors indicating an image and including a first color and a second color to output signals corresponding to color materials including a first color material and a second color material and that an output device deals with by interpolation processing using a look-up table, the method comprising:
converting the input image signals of the n colors to converted image signals of the n colors for each of the color materials by using a one-dimensional first look-up table, an input image signal corresponding to the first color to be converted to at least a first signal that is a converted image signal corresponding to the first color material and a second signal that is a converted image signal corresponding to the second color material, and an input image signal corresponding to the second color to be converted to at least a third signal that is a converted image signal corresponding to the first color material and a fourth signal that is a converted image signal corresponding to the second color material; and
converting the converted image signals of the n colors corresponding to the color materials to the output signals corresponding to the color materials by using a three-dimensional second look-up table and the interpolation processing,
wherein colors indicated by the n colors are different from colors of the color materials, and
outputting the output signal corresponding to the first color material in response to the first signal and the third signal and outputs the output signal corresponding to the second color material in response to the second signal and the fourth signal.

19. A computer-readable non-transitory storage medium that stores computer-executable instructions for executing a method for converting input image signals of a n (n≥2) colors representing an image and including a first color and a second color to output signals corresponding to color materials including a first color material and a second color material and that an output device deals with by interpolation processing using a look-up table, the method comprising:
converting the input image signals of the n colors to converted image signals of the n colors for each of the color materials by using a one-dimensional first look-up table, an input image signal corresponding to the first color to be converted to at least a first signal that is a converted image signal corresponding to the first color material and a second signal that is a converted image signal corresponding to the second color material, and an input image signal corresponding to the second color to be converted to at least a third signal that is a converted image signal corresponding to the first color material and a fourth signal that is a converted image signal corresponding to the second color material; and converting the converted image signals of the n colors corresponding to the color materials to the output signals corresponding to the color materials by using a three-dimensional second look-up table and the interpolation processing, wherein colors indicated by the n colors are different from colors of the color materials, and outputting the output signal corresponding to the first color material in response to the first signal and the third signal and outputting the output signal corresponding to the second color material in response to the second signal and the fourth signal.

* * * * *